US012762121B2

(12) United States Patent
Chandan et al.

(10) Patent No.: US 12,762,121 B2
(45) Date of Patent: Oct. 13, 2026

(54) MULTI-STAGE PARALLELIZATION MODEL FOR SCALABLE EXECUTION OF PARTITIONED ROW LIMITING

(71) Applicant: Oracle International Corporation, Redwood Shores, CA (US)

(72) Inventors: Rithvik Chandan, San Francisco, CA (US); Srikanth Bellamkonda, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 19/240,053

(22) Filed: Jun. 17, 2025

(65) Prior Publication Data

US 2025/0307241 A1 Oct. 2, 2025

Related U.S. Application Data

(63) Continuation-in-part of application No. 18/885,640, filed on Sep. 14, 2024.

(60) Provisional application No. 63/563,926, filed on Mar. 11, 2024, provisional application No. 63/583,298, filed on Sep. 17, 2023, provisional application No. 63/583,259, filed on Sep. 16, 2023.

(51) Int. Cl.

| | |
|---|---|
| ***G06F 16/2453*** | (2019.01) |
| ***G06F 16/215*** | (2019.01) |
| ***G06F 16/242*** | (2019.01) |

(52) U.S. Cl.
CPC ...... *G06F 16/24532* (2019.01); *G06F 16/215* (2019.01); *G06F 16/2425* (2019.01)

(58) Field of Classification Search
CPC ............. G06F 16/24532; G06F 16/215; G06F 16/2425
See application file for complete search history.

(56) References Cited

U.S. PATENT DOCUMENTS

| | | | | |
|---|---|---|---|---|
| 10,289,723 | B1 * | 5/2019 | Cai | G06F 16/2453 |
| 2014/0214799 | A1 * | 7/2014 | Li | G06F 16/24532 707/718 |
| 2019/0087457 | A1 * | 3/2019 | Bellamkonda | G06F 16/24553 |
| 2026/0072915 | A1 * | 3/2026 | Nitisastro | G06F 16/24549 |

* cited by examiner

*Primary Examiner* — William P Bartlett
(74) *Attorney, Agent, or Firm* — Hickman Becker Bingham Ledesma LLP

(57) ABSTRACT

A database command includes an order-by-key, a hierarchy of partition keys, a top number of partitions to return for each partitioning key level, and a number of rows to return for each partition key value combination. Communications are performed between the worker processes and a query coordinator for initial sorts of the partition keys until all of the worker processes can be used to perform the remaining sorts while avoiding duplicate rows. The results of the initial sorts are distributed to the worker processes in a manner that maintains rows of unique partition key combinations on respective individual worker processes. Each worker process constructs the remaining sorts locally using the rows it receives.

20 Claims, 18 Drawing Sheets

100

| sal | deptno | ename |
|---|---|---|
| 5000 | 10 | KING |
| 3000 | 20 | FORD |
| 3000 | 20 | SCOTT |
| 2975 | 20 | JONES |
| 2850 | 30 | BLAKE |
| 2450 | 10 | CLARK |
| 1600 | 30 | ALLEN |

*FIG. 1*

```
ORDER BY <orderbykey>
FETCH FIRST <pbycount1> PARTITION[S] BY <pbyexpr1>,
            <pbycount2> PARTITION[S] BY <pbyexpr2>,
             ...
            <pbycountn> PARTITION[S] BY <pbyexprn>,
            <rowcount> [PERCENT] ROW[S] [ONLY | WITH TIES]
```

500

900

| Id | Operation | Name |
|---|---|---|
| 0 | SELECT STATEMENT | |
| 1 | PX COORDINATOR | |
| 2 | PX SEND QC (ORDER) | :TQ10002 |
| 3 | SORT ORDER BY | |
| 4 | PX RECEIVE | |
| 5 | PX SEND RANGE | :TQ10001 |
| 6 | **ROW LIMIT PARTITION** | |
| 7 | **PX RECEIVE** | |
| 8 | **PX SEND HASH** | :TQ10000 |
| 9 | **ROW LIMIT PARTITION** | |
| 10 | PX BLOCK ITERATOR | |
| 11 | TABLE ACCESS FULL | EMP |

*FIG. 9*

MULTI-STAGE PARALLELIZATION MODEL FOR SCALABLE EXECUTION OF PARTITIONED ROW LIMITING

This application claims the benefit as a continuation-in-part of U.S. patent application Ser. No. 18/885,640, filed Sep. 14, 2024, and the benefit of U.S. Provisional Patent Application No. 63/563,926, filed Mar. 11, 2024, U.S. Provisional Patent Application No. 63/583,298, filed Sep. 17, 2023, and U.S. Provisional Patent Application No. 63/583,259, filed Sep. 16, 2023, the entire contents of which are hereby incorporated by reference.

FIELD

The present invention relates to queries for data in a database and, more specifically, to a multi-stage parallelization model for scalable execution of partitioned row limiting.

BACKGROUND

A row limiting query limits the number of rows returned in the result set. The query specifies ordering criteria and specifies the desired number of rows in the result set. An example row limiting syntax is:

OFFSET integer-literal {ROW|ROWS}
FETCH {FIRST|NEXT} [integer-literal] {ROW|ROWS} ONLY For example, a query can request only five rows from a table with the rows ordered by salary, as shown below, which returns the top five rows:

SELECT*FROM t1 ORDER BY sal FETCH FIRST 5 ROWS

In a particular case, a user may desire the limiting of rows per a particular partitioning class. For example, a user may desire the top three salaries in the top four departments, and the corresponding query would return 12 rows, or would return fewer rows if some departments do not have three salaries. The top rows or the top partitioning class can be based on an ordering criterion, such as the highest salaries or the lowest salaries.

Partitioned row limiting supports filtering at multiple levels in a hierarchical manner. An example partitioned row limiting syntax is:

```
OFFSET <offset> ROW[S]
FETCH FIRST    <pbycount1> PARTITION[S] BY <pbyexpr1>,
               <pbycount2> PARTITION[S] BY <pbyexpr2>, . . .
               <rowcount> [PERCENT] ROW[S]
               [ONLY | WITH TIES]
```

The multiple levels are referred to as partitions specified using the PARTITION clause. The request syntax limits the number of unique partitions by using <pbycount1> PARTITION [S] BY <pbyexpr1>. The number of unique partitions to be returned is specified by <pbycount1>, and the partition is represented by a partition expression <pbyexpr1>.

An example query and use case is as follows:

```
SELECT * FROM TABLE
ORDER BY SAL
FETCH FIRST        4 PARTITIONS BY ORG,
                   3 PARTITIONS BY DEPT,
                   2 ROWS ONLY
```

The partition expressions in this query are "ORG" and "DEPT". This query is used to return the top 4 organizations "ORG" based on salaries "SAL", top 3 departments "DEPT" within each of the top 4 organizations based on "SAL", and the top 2 salaries "SAL" for each of the top 3 departments within the top 4 organizations. In other words, the query gets 4 organizations with the lowest salary (or highest salary depending on the ordering criterion). Within those 4 organizations, the 3 departments per organization that have the lowest salary are obtained, and for those departments, the two lowest salaries are returned. This results in a nesting of the clauses. Such a query reflects a common use case in SQL, such as when a user inquires, "What are the top 10 salaries for the top 5 departments in the company?"

Unfortunately, execution of such a query using existing American National Standards Institute (ANSI) Structured Query Language (SQL) requires nested query blocks with window functions. An example of nested query blocks with window functions for a query with partition expressions for department and band is:

```
select *
from (select id, dept, band, sal, row_number( ) over (partition by dept, band order by sal) rk3
  from (select t1.id, t1.dept, t1.band, t1.sal
    from t1, (select dept, band
      from (select dept, band, row_number( ) over (partition by dept order by rk1) rk2
        from (select distinct dept, band, min(sal) over (partition by dept, band) rk1
          from (select *
            from t1
            where dept in (select dept
              from (select dept, min(sal) ms
                from t1 group by dept)
                order by ms
                fetch first 3 rows only)
            ) top_depts
          ) max_per_deptband
         ) rank_deptband
      where rank_deptband.rk2 <= 4
      ) top_dept_band
    where t1.dept = top_dept_band.dept and t1.band = top_dept_band.band
    ) top_dept_band_all
   ) top_dept_band_all_topn
where rk3 <= 2;
```

These nested query blocks with window functions are difficult to write and optimize, and such a query results in inferior performance. For example, the specifications require multiple query blocks, which makes it difficult to generate an optimized execution plan. We have determined that execution of the query can be improved using partitioned row limiting where multiple sorts are performed, and the results of one sort influence the results of at least one other sort. In particular, a first sort determines a full order of primary results. The first sort provides the primary results that are sorted and grouped based on a hierarchical relationship. For example, the first sort can be a primary sort that groups employees by band as a lower level in the hierarchy and by department as a higher level in the hierarchy. At least one filtering sort filters the first sort, where a filtering sort is performed for each partition. The filtering sort influences the results of the first sort, such as by identifying which results to return from the first sort. When there are multiple levels of filtering sorts, initial filtering sorts influence subsequent filtering sorts.

We have also determined that execution of the query could further be parallelized using a Query Coordinator (QC) and worker processes, where a corresponding parallel algorithm would yield correct results. In such a case, the parallel algorithm performs a sorting operation for each partition expression, such as department and band.

While the parallel algorithm improves execution of the query, the parallel algorithm may increase communication cost because it requires extensive communications between the QC and the worker processes to synchronize the sorting of each partition expression. The amount of communication increases exponentially with the degree of parallelism (DOP), where the DOP refers to the number of worker processes that can be executed simultaneously in a parallel computing environment. For example, each partition expression requires the worker processes to communicate results for each corresponding sort of multiple sorts with the QC. Also, the size of each subsequent sort is a multiple of the previous sort, where the size multiplies with each increase in the number of partitioning expressions and the number of partition counts per expression. Thus, the number of communications and size of the communication payloads increase with the increased nesting of partition expression results in each subsequent sort.

To reduce the amount of communication, worker processes could synchronize with the QC to perform a first sort on the first partition expression. The results are then distributed by HASH, such as by organization, to the worker processes, which ensures the rows are not duplicated because all of the sorting on the later expressions is performed locally at respective worker processes. Distributing the results also eliminates the need for communication with the QC after obtaining the first sort. However, such a distribution could result in the underutilization of worker processes. In particular, the DOP, the number of available worker processes, for a query is dop. If the <pbycount1> number of <pbyexpr1> is less than dop, there would be at least dop-<pbycount1> worker processes being unused. For example, if there are five worker processes and there are four organization partitions, one worker process would not be used for the remaining sorting operations. This leads to lower performance compared to using multiple synchronization steps with the QC, which tries to ensure higher worker process utilization. Therefore, there is a need to balance communication costs and efficient utilization of worker processes.

The approaches described in this section are approaches that could be pursued, but not necessarily approaches that have been previously conceived or pursued. Therefore, unless otherwise indicated, it should not be assumed that any of the approaches described in this section qualify as background merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

FIG. 1 is an illustration of partitioned row limiting according to an example embodiment.

FIG. 9 is an example illustration of an execution plan for partitioned row limiting according to an example embodiment.

DETAILED DESCRIPTION

Figure 2:
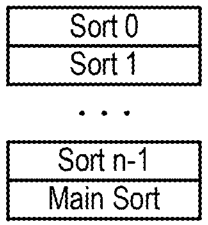
FIG. 2 is an illustration of a high-level logic clause according to an example embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The illustrative embodiments provide a multi-stage parallelization model for scalable execution of partitioned row limiting. A database command includes an order-by-key, a hierarchy of partition keys, a top number of partitions to return for each partitioning key level, and a number of rows to return for each partition key value combination. The partition keys are partition expressions. In an example embodiment, a partitioned row limiting clause enables users to use easier syntax to retrieve results.

```
ORDER BY <orderbykey>
FETCH FIRST     <pbycount1> PARTITION[S] BY <pbyexpr1>,
                <pbycount2> PARTITION[S] BY <pbyexpr2>,
                  ...
                <pbycountn> PARTITION[S] BY <pbyexprn>,
                <rowcount> [PERCENT] ROW[S]
                [ONLY | WITH TIES]
```

The syntax includes n partition expressions, such as <pbyexpr1>, <pbyexpr2>, . . . <pbyexprn>. The clause is used to retrieve the top <rowcount> rows per partition expression combination. Sort structures, Sort 0 to Sort n−1, are used for the partition expressions. For example, Sort 0 is mapped to <pbyexpr1>, Sort 1 is mapped to <pbyexpr2>, etc.

The clause employs a scalable parallel algorithm to retrieve results. The parallel algorithm involves two phases: a communication phase between a QC and worker processes for collaborative sorting that involves communication of local sorting results generated by each worker process to QC, followed by a local sort phase where data redistributed among worker processes is sorted in a way that requires only local information to perform global sorting for a set of partitions. For example, the communication phase collaborates top number of partitions to return for certain partitioning key levels. The algorithm enters the local sort phase when a threshold has been met for distributing data to worker processes for local sorting by each worker process. For example, the local sort phase performs local sorting for the remaining partitions.

Initially, each worker process receives rows from an underlying row source, where rows are not duplicated across worker processes. Each worker process creates its own local main sort structure that includes <rowcount> number of rows per distinct <pbyexpr1> through <pbyexprn> combination based on the rows it has received.

In the communication phase, worker processes perform sorting and communicate with a QC that coordinates the sort activities of the worker processes. Communications are performed between the worker processes and the QC for initial sorts until all of the worker processes can be used to perform the remaining sorts in a localized manner to avoid extra communication. In particular, each worker process communicates with the QC to synchronize generation of auxiliary sort structures, Sort 0 to Sort r−1.

An optimal point, r, is determined at which to perform the sort operations locally at the worker processes. This optimal point corresponds to when the number of rows in Sort r is greater than or equal to the DOP, which is the number of available worker processes.

The results of the initial sorts are distributed to the worker processes in a manner that maintains rows of a unique partition expression combination on individual worker processes. For example, upon identification of the top combinations up to a level r, all the rows belonging to the partitions in sort r−1 in the main sort are distributed to the worker processes by HASH of the resulting partition expression combinations. Each worker process can now determine the next r→n partitions locally. This ensures each worker process sorts on unique partition expression combinations and rows of a particular partition expression combination are not spread across different worker processes.

In the local sort phase, each worker process runs the main sort to eliminate any duplicate rows from <pbyexpr1>, <pbyexpr2>, . . . <pbyexprn> combination. Each worker process then constructs the remaining sort structures, Sort r to Sort n−1, locally using the rows it receives. The worker processes use Sort n−1 to identify the top <pbyexpr1>, <pbyexpr2>, . . . <pbyexprn> combinations and produce the <rowcount> rows from main sort. Computing Sort r to Sort n−1 locally on each worker process reduces the number of communication rounds with the QC from n communication rounds to r communication rounds. This approach helps balance communication overhead and worker process utilization.

For example, if there are three department partitions, two band partitions, two thread partitions, and four available worker processes, two sort operations are first performed with the QC. The two sort operations result in six department/band combinations. The results are distributed by HASH to the four worker processes, which then perform the remaining thread partition sort locally. Thus, two rounds of communication are performed for the first two sorts instead of three rounds of communication for all three sorts. Also, all four worker processes are utilized for the HASH by department/band combinations instead of only three for HASH by department. Distributing the results for the remaining sort operations also avoids duplicate rows because each worker process locally sorts rows for a unique combination of partition expressions.

In an example embodiment, a database command includes an order-by-key, a hierarchy of partition keys, a top number of partitions to return for each partitioning key level, and a number of rows to return for each partition key value combination. Communications are performed between the worker processes and a query coordinator for initial sorts of the partition keys until all of the worker processes can be used to perform the remaining sorts while avoiding duplicate rows. The results of the initial sorts are distributed to the worker processes in a manner that maintains rows of unique partition key combinations on respective individual worker processes. Each worker process constructs the remaining sorts locally using the rows it receives.

Embodiment Results

Embodiments can provide a multi-stage parallelization method for scalable execution of a partitioned row limiting SQL clause. The partitioned row limiting clause includes a hierarchy of partition keys, a respective top number for respective key level partitions to return for each partitioning key level, and a number of rows to return for each partition key value combination. The partitioned row limiting clause allows a DBMS to use a more native, scalable execution algorithm, which is more performant than multiple nested window clauses using current ANSI SQL to achieve the same results.

A multi-stage parallelization model for scalable execution of partitioned row limiting employs a scalable algorithm to retrieve results for the parallel partitioned row limiting clause. Worker processes perform a plurality of iterations involving determination of top combinations of partition key values and communication with a coordinator process for each current partitioning key level until a criterion is satisfied. The worker processes then generate top rows for top combinations of partition key values for the remaining partitioning key levels. The multi-stage parallelization model balances communication and process utilization to provide performant execution. The multi-stage parallelization method can utilize all available worker processes and balance server utilization and communication costs to scalably execute a partitioned row limiting query. Natively supporting partitioned row limit in both syntax and a parallel implementation solves the optimization problem for partitioned row limiting in ANSI SQL.

Partitioned Row Limiting

FIG. 1 is an illustration 100 of partitioned row limiting according to an example embodiment. In this example, a user may desire to fetch employees from departments ordered by salary, where the goal is to get the top two departments based on salary, with the top two employees ordered by salary per department. The first level of the hierarchy is to get the departments, and the second level is to get the best salaries per department. The following is an example query using partitioned row limiting for such a search:

```
SELECT deptno, ename, sal
FROM emp
ORDER BY sal DESC
FETCH FIRST          2 PARTITIONS BY deptno,
                     2 ROWS ONLY
```

The query selects the department number, the employee name, and the salary from an employee table. It fetches the first two partitions by department number with two rows per partition and orders the results by salary in descending order.

The semantic is to first order the records by sal DESC. Then, find the first two distinct deptno in this order. Then, filter records so that only the records are kept whose deptno is one of the two selected deptnos. Then, filter records so that only two rows are kept for each deptno.

In the illustration 100, the best department is department 10, where the employee King has the highest salary of 5000 and Clark has the next highest salary of 2450. The next best department is department 20, where Ford makes 3000 and Scott makes 3000. Blake in department 30 makes 2850, which is more than Clark, but Blake is not returned because the row does not satisfy the first two partitions by department number. Thus, the top two department partitions are 10 and 20, and department number 30 is not one of the top two departments. In this case, the top departments are chosen based on the highest salary. In other cases, the top results can be chosen based on average salaries or other scoring concepts.

Partitioned Row Limiting Clause

FIG. 2 is an illustration of a high-level logic clause 200 according to an example embodiment. The clause 200 is used to retrieve the top <rowcount> rows per <pbyexpr1>, <pbyexpr2>, . . . <pbyexprn> combination based on <orderbykey>. Only the top <pbycount1> number of <pbyexpr1>, top <pbycount2> number of <pbycount2> per <pbyexpr1>, and so on should be returned. In the following description, the use of "top" is based on <orderbykey>. Multiple order by keys, such as, <obykey1>, <obykey2>, . . . , <obykeyn>, are also possible.

For example, <orderbykey> can be salary, <pbyexpr1> can be departments, <pbyexpr2> can be organizations, etc. The <pbycount1> can be for the top two departments, the <pbycount2> can be for the top three organizations in the top two departments, etc. For a given combination of departments and organizations, only <rowcount> number of rows, such as four salaries per combination, are desired. An example of such a query is shown below:

```
SELECT deptno, ename, sal
FROM emp
ORDER BY sal DESC
FETCH FIRST          2 PARTITIONS BY deptno,
                     3 PARTITIONS BY org,
                     4 ROWS ONLY
```

When the query is executed, the main sort stores four rows for all department, organization combinations. Auxiliary sorts, such as Sort 0 through Sort n−1, are then performed to determine the top departments and the top organizations for those departments. The top four rows have already been determined from the main sort. After the auxiliary sorts are performed, the main sort is used to filter the <rowcount> number of rows, such as four rows, for each given combination of department and organization. The result returns the top four salaries in the top two organizations of the top three departments.

Partitioned Row Limiting Serial Algorithm

Figure 3:
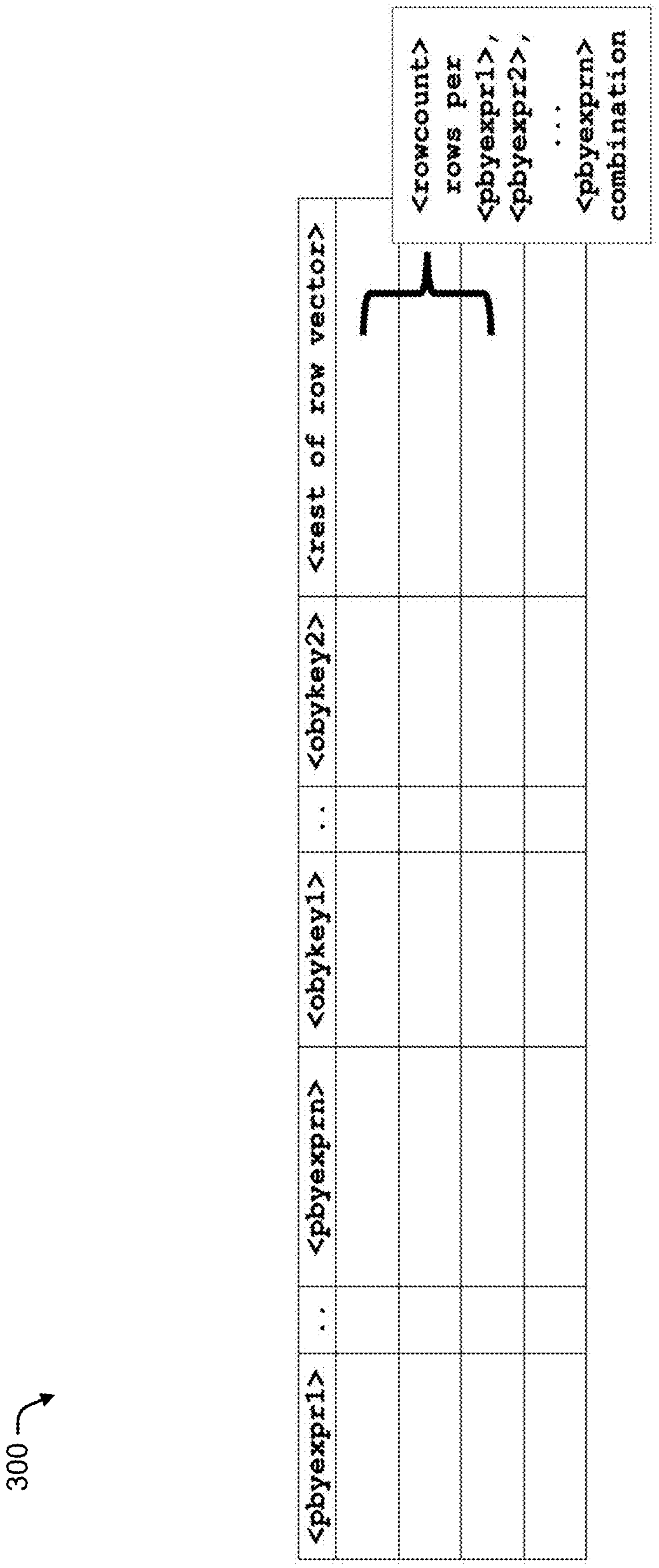
FIG. 3 is an illustration of a main sort structure according to an example embodiment.

FIG. 3 is an illustration of a main sort structure 300 according to an example embodiment. A serial algorithm for partitioned row limiting starts with building a main sort by reading rows from the underlying row sources into the main sort. The main sort structure 300 stores the top <rowcount> number of rows for each <pbyexpr1>, <pbyexpr2>, . . . <pbyexprn> combination. For example, the top <rowcount> number of rows is stored for each combination of partition expressions. For the example query above, the main sort stores four rows for all department, organization combinations. This main sort structure can be positionally indexed based on the <pbyexpr1>, <pbyexpr2>, . . . <pbyexprn> keys to ensure fast lookup. Auxiliary sorts, Sort 0 through Sort n−1, are then performed iteratively to determine the top partition expressions, such as the top departments, and the top organizations for those departments. The main sort can be considered a partitioning sort that stores rows based on partitioning information, <pbyexpr>, first, such as the department and organization, and then orders the rows based on the sorted order, <orderbykey>, such as the salaries. For example, the main sort is first partitioned by departments, the department partitions are sub-partitioned by organizations, and the rows are ordered by salary.

Figure 4:
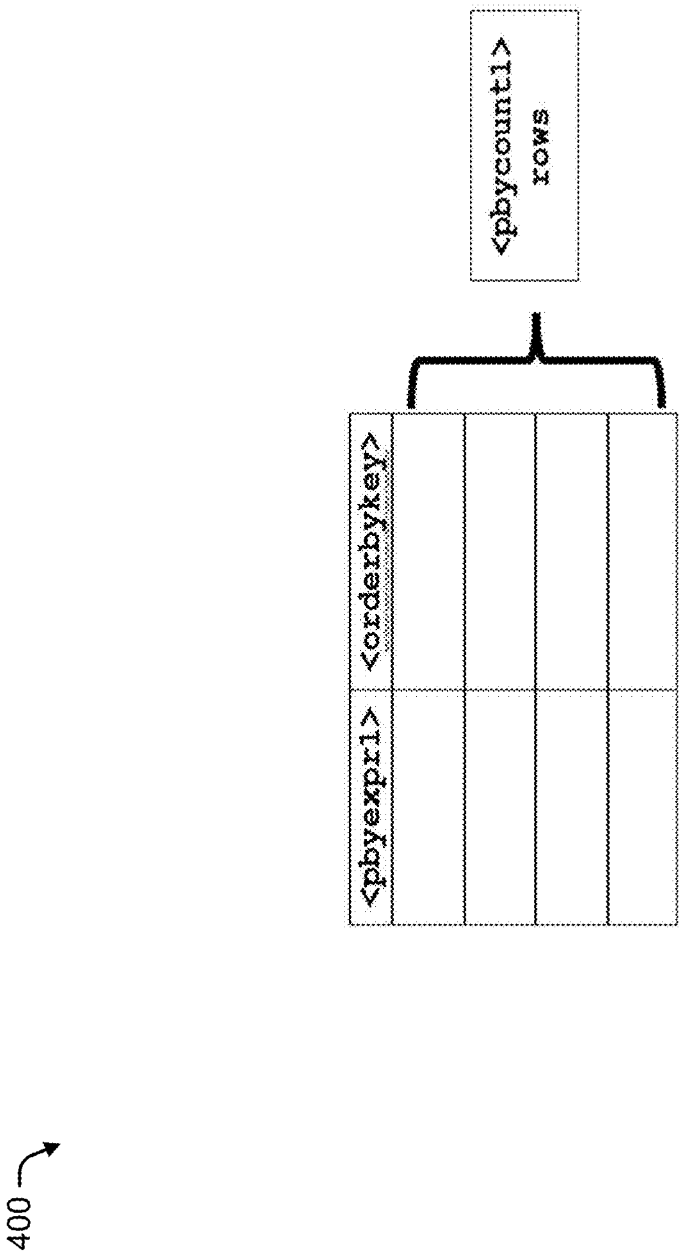
FIG. 4 is an illustration of an auxiliary sort structure for Sort 0 according to an example embodiment.

FIG. 4 is an illustration of an auxiliary sort structure 400 for Sort 0 according to an example embodiment. Sort 0 contains the top <pbycount1> number of rows for <pbyexpr1> sorted by the <orderbykey>. The rows from the underlying row source are read and inserted into Sort 0. For the above example query, Sort 0 determines the top five departments ordered by salary. If there are multiple <orderbykey>s, each sort structure can include columns for each <orderbykey>.

Figure 5:
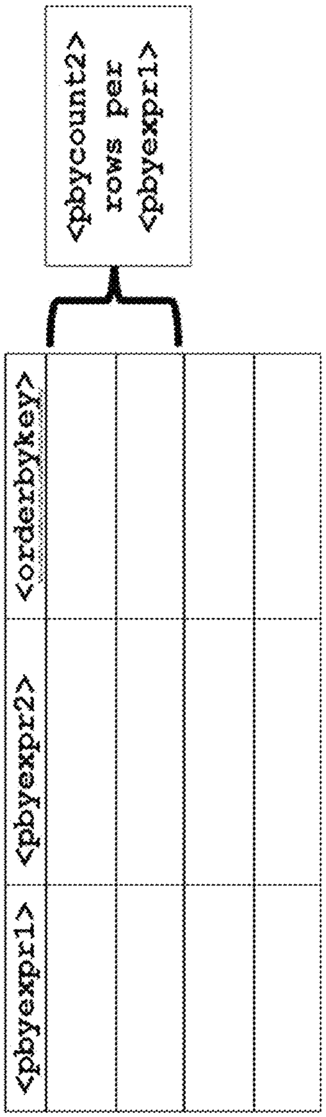
FIG. 5 is an illustration of an auxiliary sort structure for Sort 1 according to an example embodiment.

FIG. 5 is an illustration of an auxiliary sort structure 500 for Sort 1 according to an example embodiment. For each of the <pbyexpr1>s in Sort 0, the top <pbycount2> number of <pbyexpr2> per <pbyexpr1> are identified in the main sort structure to create auxiliary Sort 1. First, the top <pbycount2> number of <pbyexpr2> per <pbyexpr1> are identified. Then, the top <pbycount1> number of <pbyexpr1> are read from the main sort. For example, the operation can position directly to each <pbyexpr1> in the main sort to locate the relevant <pbyexpr2>s. The <pbycount2> number of <pbyexpr2> per <pbyexpr1> are inserted into Sort 1. For the example query above, Sort 1 identifies the top 4 organizations within the top 5 departments. The top 4 organizations are obtained from the main sort for each of the top 5 departments found in Sort 0.

Figure 6:
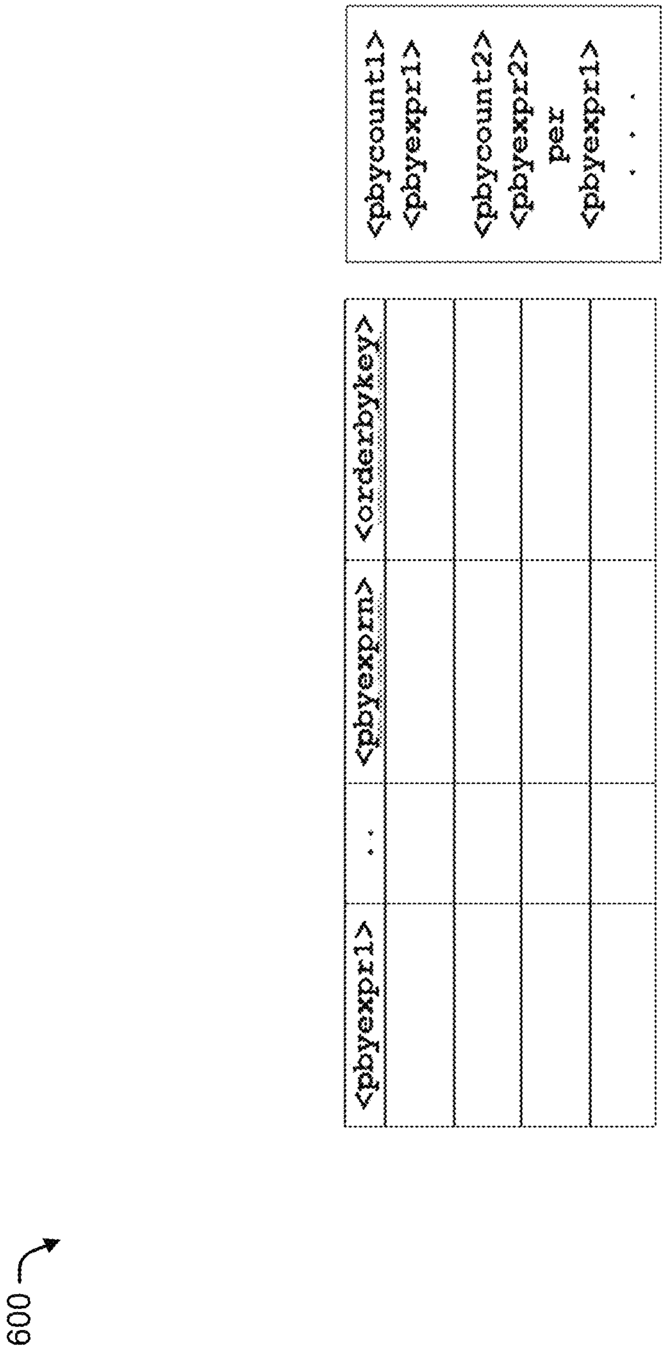
FIG. 6 is an illustration of an auxiliary sort structure for Sort n−1 according to an example embodiment.

FIG. 6 is an illustration of an auxiliary sort structure 600 for Sort n−1 according to an example embodiment. Sort 0 is used to find the top <pbycount1> number of <pbyexpr1> rows, Sort 1 is used to find the top <pbycount2> number of <pbyexpr2> rows, etc. Eventually, Sort n−1 contains the desired <pbyexpr1>, <pbyexpr2>, . . . <pbyexprn> combinations as results for the query. For the example query above, Sort n−1 contains the top department and organization combinations.

For each <pbyexpr1>, <pbyexpr2>, . . . <pbyexprn> in auxiliary Sort n−1 we position into the main sort and produce the <rowcount> rows stored in it. In the example query, now that the top department and top organizations within the departments are known, the main sort is searched for all the rows for each department, organization combination to produce the four rows with the respective top four salaries per combination.

Partitioned Row Limiting Parallel Algorithm

Figure 7:
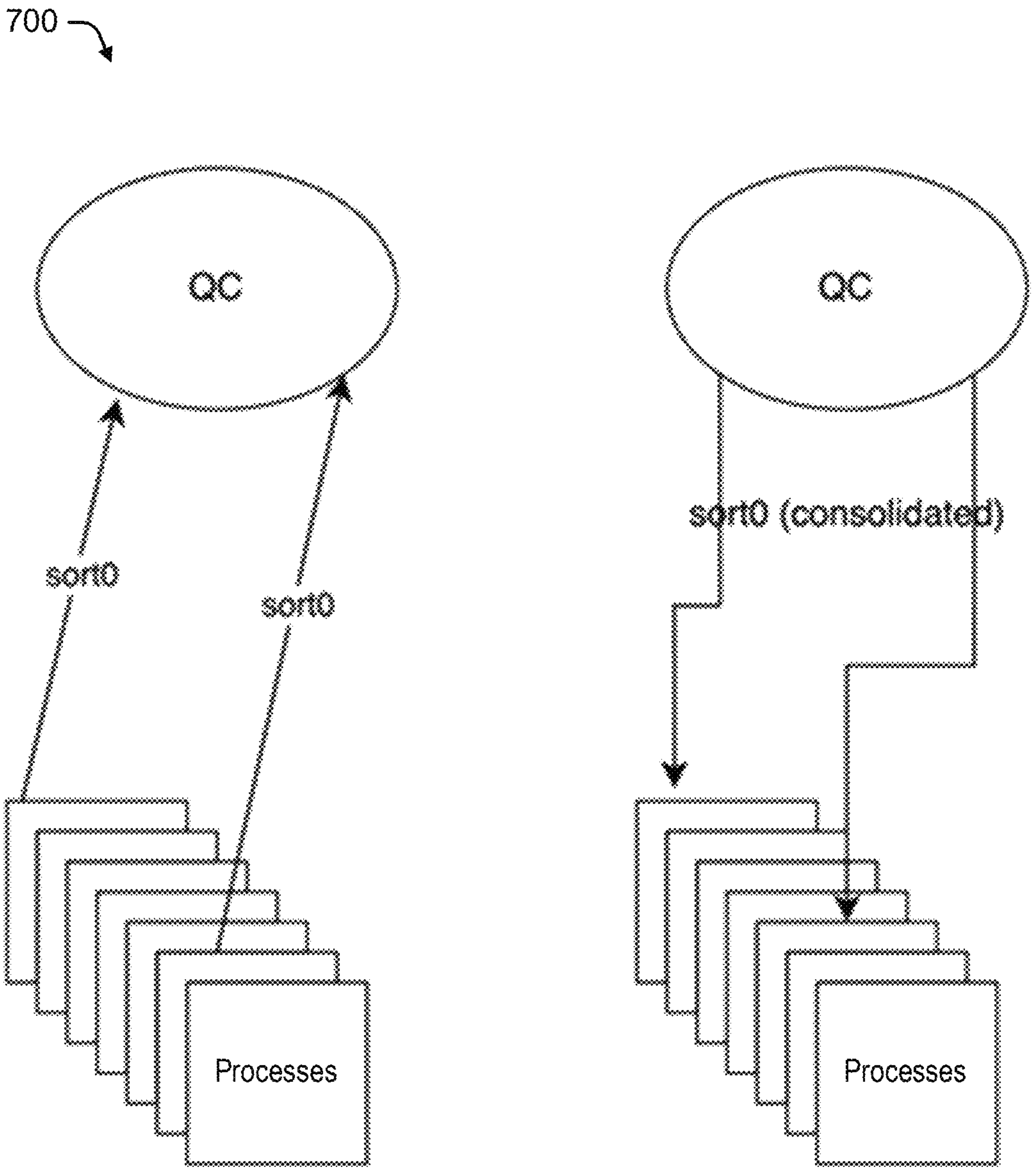
FIG. 7 is an example illustration of a communication phase for parallelization of partitioned row limiting according to an example embodiment.

FIG. 7 is an example illustration 700 of a communication phase for parallelization of partitioned row limiting according to an example embodiment. One approach for parallelizing the partitioned row limiting algorithm is to insert synchronization stages in the serial algorithm. The serial algorithm built the main sort and built auxiliary sorts, Sort 0 to Sort n−1, to get the final results. The parallel algorithm ensures there is consolidation. For example, worker processes determine the top five departments from their local main sorts, and coordination is performed to determine the global top five departments.

The parallel algorithm involves a communication phase for the synchronization stages and a consolidation phase to remove duplicate results. In the communication phase, a QC manages the parallel execution method. It distributes the work among worker processes and coordinates their activities to ensure efficient query execution. The worker processes can also be considered parallel workers, servers, parallel execution servers, compute servers, or other types of processes.

In the communication phase of the parallel algorithm, each worker process receives rows from the underlying row source. Different worker processes receive different rows from the underlying row source, where rows are not duplicated across worker processes. In a manner similar to the serial algorithm, each worker process maintains <rowcount> number of rows per distinct <pbyexpr1> through <pbyexprn> combination in its own local main sort structure based on the rows it has received.

Each worker process synchronizes the auxiliary sort structures, Sort 0 to Sort n−1, using the QC. For example, each worker process builds a Sort 0, which contains top <pbycount 1> number of <pbyexpr1>. Each individual Sort 0 is communicated to QC to obtain a consolidated Sort 0, as shown in the illustration 700. In particular, the QC receives the Sort 0 from each worker process and consolidates them into a consolidated Sort 0 that is distributed back to the worker processes. For the example query, now the worker processes have the globally accepted top departments in the globally accepted order. The worker processes each use this consolidated Sort 0 along with its local main sort to come up with each individual Sort 1 and communicate with QC to obtain consolidated Sort 1. For the example query, each worker process returns the top organizations from its local main sort per global top department. This operation of sorting and communication with the QC continues until a consolidated Sort n−1 is obtained, and each worker process produces <rowcount> number of rows per combination based on its local main sort. There are n stages of communication that are required to come up with the final <pbyexpr1>, <pbyexpr2>, . . . <pbyexprn> combinations of interest. A final ordering operation can order the final returned rows based on the ordering criteria, such as based on salary.

It is possible that multiple worker processes have the same <pbyexpr1>, <pbyexpr2>, . . . <pbyexprn> combination. In this case, the final results would produce more than <rowcount> rows per <pbyexpr1>, . . . <pbyexprn> combination. The two-stage model is necessary because the n stages of communication are used to determine the top partition combinations, and, for each top partition combination, <rowcount> rows are returned from the local main sort. The issue that can arise is that two worker processes might have rows from the same top partition combination. For example, if dept1, org2 is a top partition combination, <rowcount> should be returned, such as two rows per dept, org pair. However, if dept1, org2 are found in two worker processes, then each worker process would produce two rows for dept1, org2. To avoid this duplication, we HASH by dept, org, so all rows among all the worker processes containing dept1, org2 end up in the same consumer worker process. Thus, when this same worker process builds its local main sort, it will only keep the top 2 rows for dept1, org2.

Results Consolidation

Figure 8:
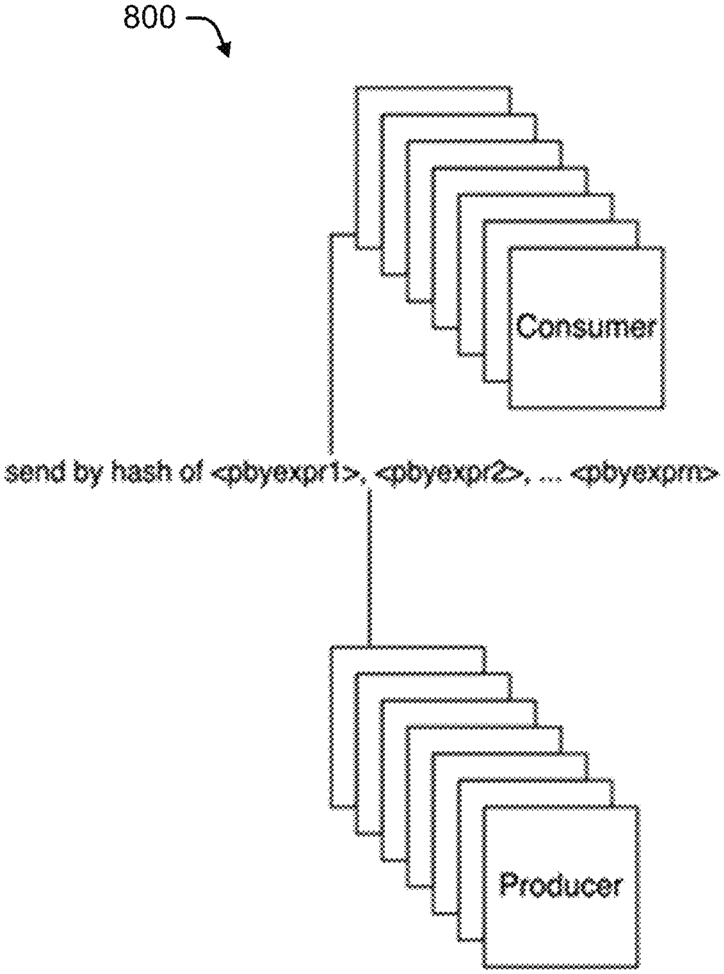
FIG. 8 is an example illustration of a consolidation phase for parallelization of partitioned row limiting according to an example embodiment.

FIG. 8 is an example illustration 800 of a consolidation phase for parallelization of partitioned row limiting according to an example embodiment. The consolidation phase removes duplicate results and produces the final rows.

The consolidation phase ensures that there are only <rowcount> final rows per <pbyexpr1>, <pbyexpr2>, . . . <pbyexprn> combination. The rows are distributed by HASH of <pbyexpr1>, <pbyexpr2>, . . . <pbyexprn> combinations from the worker processes, such as producer worker processes, to consumer worker processes. The HASH is used to ensure rows from the same combination end on the same consumer process. The consumer processes construct the local main sort structure again to ensure there are finally only <rowcount> rows per <pbyexpr1>, <pbyexpr2>, . . . <pbyexprn> combination.

The illustrated producers and consumers are types of parallel execution processes, such as servers, that work together to process a query efficiently. The producers are responsible for data fetching operations and performing initial sort operations. The consumers take the rows retrieved and generated by the producers and perform further operations on them, such as consolidating the sorts.

Execution Plan

FIG. 9 is an example illustration 900 of an execution plan for partitioned row limiting according to an example embodiment. The execution plan reflects the operations described above. For example, the Id 11 TABLE ACCESS FULL operation accesses an employee table EMP. The Id 10 PX BLOCK ITERATOR operation chunks the table below it and gives the chunks to worker processes, such as the producer processes, where the term PX stands for parallel execution. The Id 9 ROW LIMIT PARTION operation performs the rounds of QC communication to identify the top partition expressions <pbyexpr>, such as the top departments, the top organizations, etc. The Id 9 operation sends the results by HASH in the Id 8 PX SEND HASH operation. For example, the producer processes send the results by HASH to the consumer processes. The TQ Name represents a table queue, which acts as a queue through which a producer process sends rows to a consumer process. The number of the TQ can indicate the number of times data, such as rows, are redistributed. The Id 6 ROW LIMIT PARTITION operation builds the main sort. The final sort order is performed in the Id 3 SORT ORDER BY operation to get the correct order of the results. The following is an example query for an execution plan:

```
SELECT /*+ parallel */ *
FROM t1
ORDER BY sal DESC
FETCH FIRST        3 PARTITIONS BY dept,
                   2 PARTITIONS BY band,
                   2 PARTITIONS BY thread,
                   3 ROWS ONLY;
```

For this example query, the execution plan performs three rounds of communication in the Id 9 ROW LIMIT PARTION operation. In the Id 8 PX SEND HASH, the plan sends three rows by HASH of department, band, and thread, so the same department, band, and thread ends up on the same worker process in the Id 6 ROW LIMIT PARTITION operation, which ensures only three rows for a given department, band, and thread combination are provided to the Id 3 SORT ORDER BY operation.

While the parallel algorithm described above yields correct results, it has the issue of a high communication cost because it requires extensive communications to synchronize Sort 0 to Sort n−1. Each partition level requires the worker processes to communicate the auxiliary sorts with the QC. The number of communications and size of the payloads increase with increased nesting in each subsequent sort. The size of Sort 0 to Sort n−1 can be very large, with the size of each auxiliary sort being a multiple of the one before.

As discussed above, the amount of communication increases hugely due to the DOP, where the DOP refers to the number of tasks or worker processes that can be executed simultaneously in a parallel computing environment. It is a measure of how many operations can be performed concurrently, which can significantly impact the performance and efficiency of computational tasks. For example, the degree of parallelism determines how many parallel worker processes are used to execute a query. A higher DOP can lead to faster query execution times, but it also requires more system resources. For example,

```
sort 0 communication size: <pbycount1> * # of worker processes
sort 1 communication size: <pbycount1> * <pbycount2> * # of worker processes
  ...
sort n-1 communication size: <pbycount1> * ... * <pbycountn> * # of worker processes
```

As a more particular example, the top three departments have three rows per worker process in Sort 0. Sort 1 has two bands for each department, which results in 3×2=6 rows per worker process. Sort 2 has two partitions for each thread, which results in 12 rows per worker process. Thus, the communication cost between the worker processes and the QC grows with each increase in the number of partitioning expressions and the number of partition counts per expression.

Distribution of Rows to Worker Processes by Hash

Figure 10:
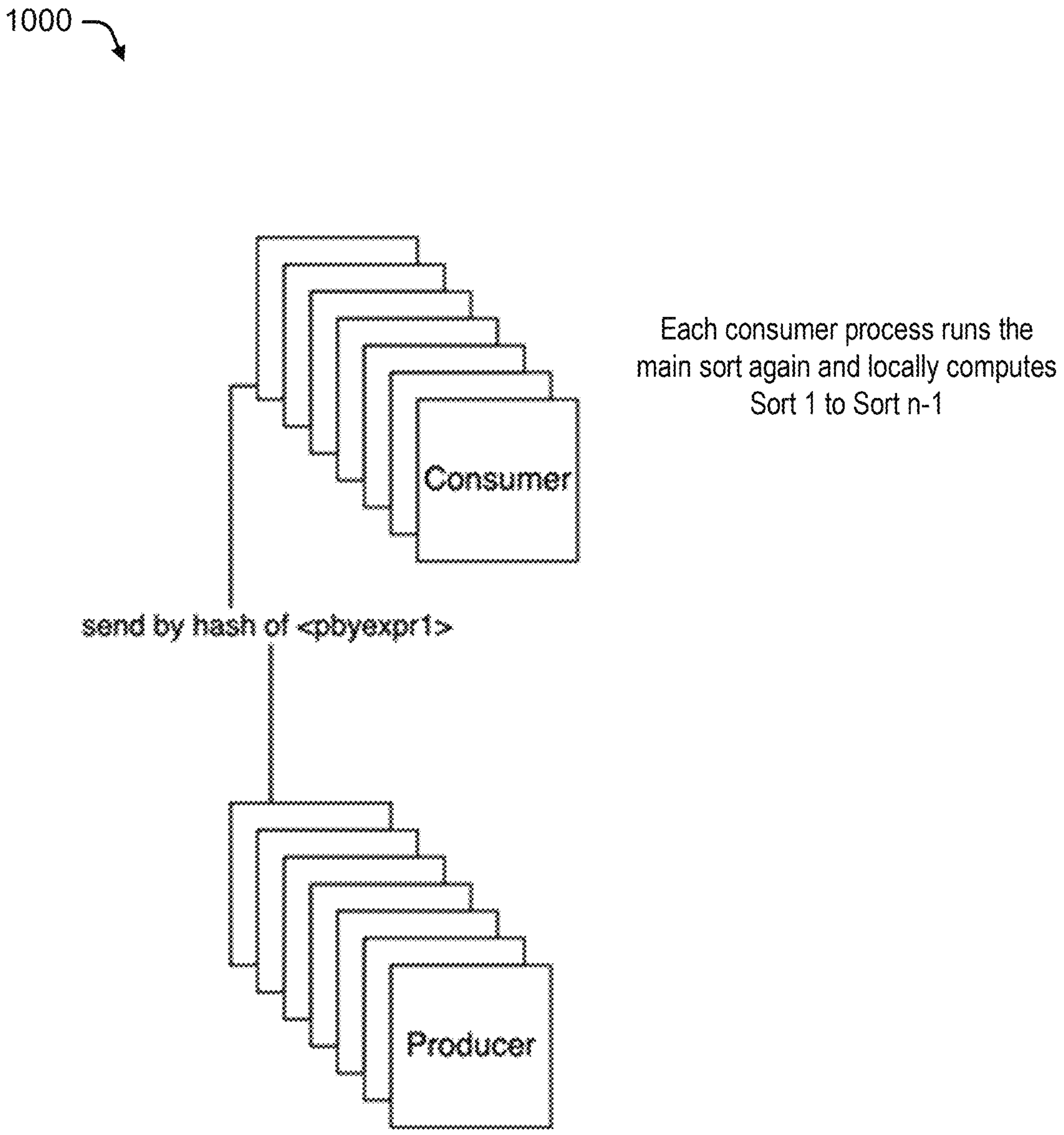
FIG. 10 is an example illustration of the distribution of rows to worker processes by HASH according to an example embodiment.

FIG. 10 is an example illustration 1000 of the distribution of rows to worker processes by HASH according to an example embodiment. The number of communications between a QC and worker processes for sorting can be reduced by hashing the data to localize computation. One round of communication is performed between worker processes and the QC for the first sort, and the remaining sorts are performed locally at the worker processes. For example, producer processes compute Sort 0 consolidated to identify the top <pbycount1> number of <pbyexpr1> and synchronize with the QC as described above. The producer processes then HASH the results on <pbyexpr1> to ensure rows with same <pbyexpr1> are on the same consumer worker process. Due to this distribution pattern, the subsequent stages of computing Sort 1 to Sort n−1 are performed locally on each consumer process without requiring additional synchronization and communication with the QC.

For example, producer processes perform one round of communication with the QC to agree on the top three departments. The rows of those departments are sent by the HASH of the department to ensure all the rows of a given department are on one consumer process. All the bands of one department are on one consumer process, all the bands of another department are on another consumer process, etc. Each consumer process then performs local sort operations to determine the top bands and threads. This ensures the rows are not duplicated because the lower sorts are performed locally on each consumer process.

However, mere distribution by HASH results in the underutilization of worker processes. For example, the DOP, the number of available worker processes, for a query is dop. If the <pbycount1> number of <pbyexpr1> is less than dop, there would be at least dop-<pbycount1> worker processes being unused. For example, if there are four worker processes and there are three departments, at least one worker process would not be used for the remaining sorting operations, which results in lost computing power. To elaborate, three departments can HASH to one to three processes, and at least one process will be unused, resulting in lost computing power. This leads to lower performance compared to using multiple synchronization steps with the QC, which tries to ensure higher worker process utilization. Therefore, there is a need to balance communication cost and utilization of worker processes.

Distribution to Worker Processes Based on Degree of Parallelism

Figure 11:
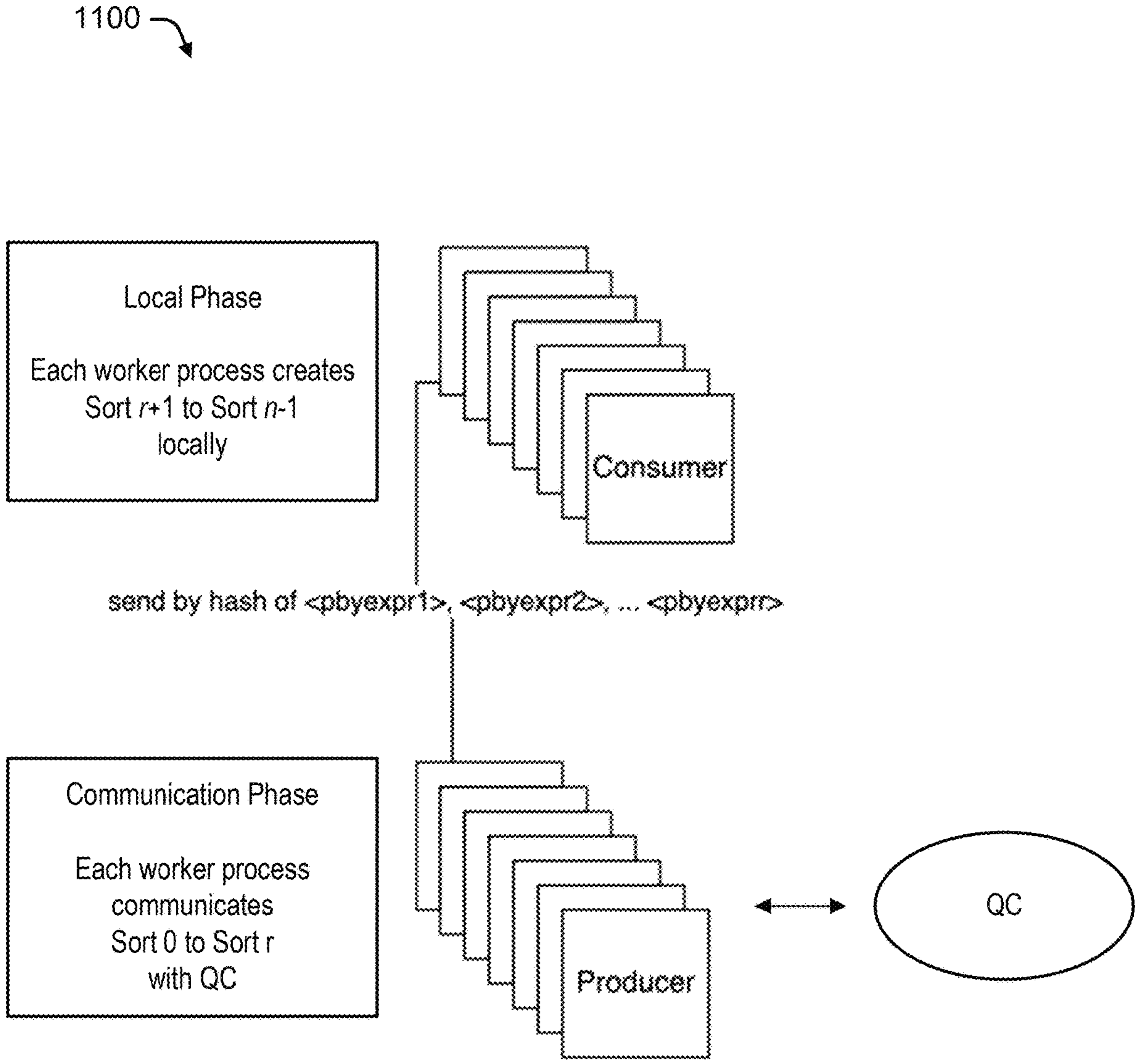
FIG. 11 is an example illustration of the distribution of rows to worker processes based on the degree of parallelism according to an example embodiment.

FIG. 11 is an example illustration 1100 of distribution of rows to worker processes based on degree of parallelism according to an example embodiment. The communication cost and utilization of worker processes is balanced by first performing sort operations synchronized with the QC. An optimal point is determined at which to perform the sort operations locally at the worker processes. Thus, communications are performed between the worker processes and the QC for initial sorts until a point at which all of the worker processes can be used to locally perform the remaining sorts while avoiding duplicate rows.

For example, if there are three department partitions, two band partitions, two thread partitions, and four available worker processes, two sort operations are first performed with the QC, which results in six department/band combinations. The results are distributed by HASH to the four worker processes, which then perform the remaining thread partition sort locally. Thus, two rounds of communication are performed for the first two sorts instead of three rounds of communication for all three sorts. Also, all four worker processes are utilized for the HASH by department/band combinations instead of only three for HASH by department. This also avoids duplicate rows because each worker process locally sorts rows for a unique combination of partition expressions.

To elaborate, consider the following clause:

```
ORDER BY <orderbykey>
FETCH FIRST     <pbycount1> PARTITION[S] BY <pbyexpr1>,
                <pbycount2> PARTITION[S] BY <pbyexpr2>, ...
                <pbycountn> PARTITION[S] BY <pbyexprn>,
                <rowcount> [PERCENT] ROW[S]
                [ONLY | WITH TIES]
```

There are at most <pbycount1> number of rows in Sort 0, <pbycount1>*<pbycount2> number of rows in Sort 1, and <pbycount1>*<pbycount2>* . . . <pbycountn> number of rows in Sort n−1. The optimal point, sort level r, is found before sort level n at which to redistribute the data by HASH to worker processes. The value of r is determined at the point where the number of rows in Sort r >=dop, such as when the number of rows is greater than or equal to the number of available worker processes. Sort computations happen locally at the worker processes from there on. This balances communication cost and worker process utilization.

Initially, each producer process receives rows from an underlying row source, where rows are not duplicated across producer processes. Each producer process creates its own local main sort structure that includes <rowcount> number of rows per distinct <pbyexpr1> through <pbyexprn> combination based on the rows it has received. The operation then involves a communication phase and a local sort phase.

Communication Phase

In the communication phase, producer processes perform sorting and communicate with the QC, which coordinates the sort activities of the producer processes. Each producer process communicates with the QC to synchronize generation of auxiliary sort structures, Sort 0 to Sort r. An optimal point, r, is determined at which to perform the sort operations locally at consumer processes. This optimal point corresponds to when the number of rows in Sort r is greater than or equal to the number of available processes.

For example, to find the value of r, a series of communication phases, such as synchronization phases, are conducted by the QC and producer processes to identify the top <pbyexpr>s starting with Sort 0, where Sort 0 contains the top <pbycount1> number of <pbyexpr1>. The point r is defined to be the point at which the number of rows in sort r>=dop. From this point onwards, the results are distributed to consumer processes by HASH by <pbyexpr1>, <pbyexpr2>, . . . <pbyexprr+1>. Thus, communications are performed between the worker processes and the QC for initial sorts until all of the worker processes can be used to perform the remaining sorts while avoiding duplicate rows.

Local Sort Phase

In the local sort phase, after the consumer process receives rows from the producer process that conducted the synchronization phases, each consumer process runs the main sort to eliminate any duplicate rows from <pbyexpr1>, <pbyexpr2>, . . . <pbyexprn> combination. Each consumer process then constructs Sort r+1 to Sort n−1 locally using the rows it receives. The consumer processes finally use Sort n−1 to identify the top <pbyexpr1>, <pbyexpr2>, . . . <pbyexprn> combinations and produce the <rowcount> rows from the main sort. Computing Sort r+1 to Sort n−1 locally on each consumer process reduces the communication with the QC to r communications instead of n communications. This approach helps balance communication and worker process utilization.

In an example with four available worker processes, the worker processes operate as both the producer and consumer processes. For example, a particular worker process is a producer when it is sending data and is a consumer when it is receiving data. There are three department partitions, two band partitions, and two thread partitions. In the communication phase, the producer processes communicate with the QC to identify the top three departments and the top two bands for those departments, which results in six unique department/band pairs. The results are distributed by HASH of department/band to the consumer processes. This results in all four consumer processes being used for subsequent sort operations because there are six unique department/band pairs, as opposed to only distributing by HASH of the three department partitions to three consumer processes. The consumer processes then locally identify the top two threads without extra communication with the QC, which results in less communication overhead.

It is possible that the point r is not reached, and all the sorting is done while communicating with the QC. For example, there may be two rows, two departments, two bands, and thousands of available worker processes. Thus, the size of the sorts is small, communication using such a small payload is acceptable, and all available worker processes are being used.

As a further example, the following query is for partition expressions 0 to n:

```
SELECT orgid, sal
FROM table
ORDER BY sal DESC
FETCH FIRST        X0 PARTITIONS BY P0
                   X1 PARTITIONS BY P1
                   . . .
                   Xn PARTITIONS BY Pn
                   Z ROWS ONLY;
```

The number of available worker processes is the DOP. The point r is determined where the size of the sort r is greater than the DOP. Thus, in the communication phase, the sorts for the following expressions are performed at the producer processes:

| | |
|---|---|
| $X_0$ | PARTITIONS BY $P_0$ |
| $X_1$ | PARTITIONS BY $P_1$ |
| . . . | |
| $X_r$ | PARTITIONS BY $P_r$ |

When splitting the sorting at point r, the sorts from 0 to r involve communication between the worker processes and the QC. Thus, in the communication phase, the producer processes determine the top $X_0$ $P_0$, $X_1$ $P_1$, . . . . $X_r$ $P_r$ combinations while communicating with the QC. Then, in the local phase, the sorts for the following expressions are performed locally at the consumer processes:

| | |
|---|---|
| $X_{r+1}$ | PARTITIONS BY $P_{r+1}$ |
| . . . | |
| $X_n$ | PARTITIONS BY $P_n$ |

In the local phase, the consumer processes locally determine the top $X_{r+1}$ $P_{r+1}$ . . . . $X_n$ $P_n$ combinations without requiring communication with the QC. Thus, the sorts from r+1 to n−1 are performed locally to avoid communication with the QC.

Example Methods

Figure 12:
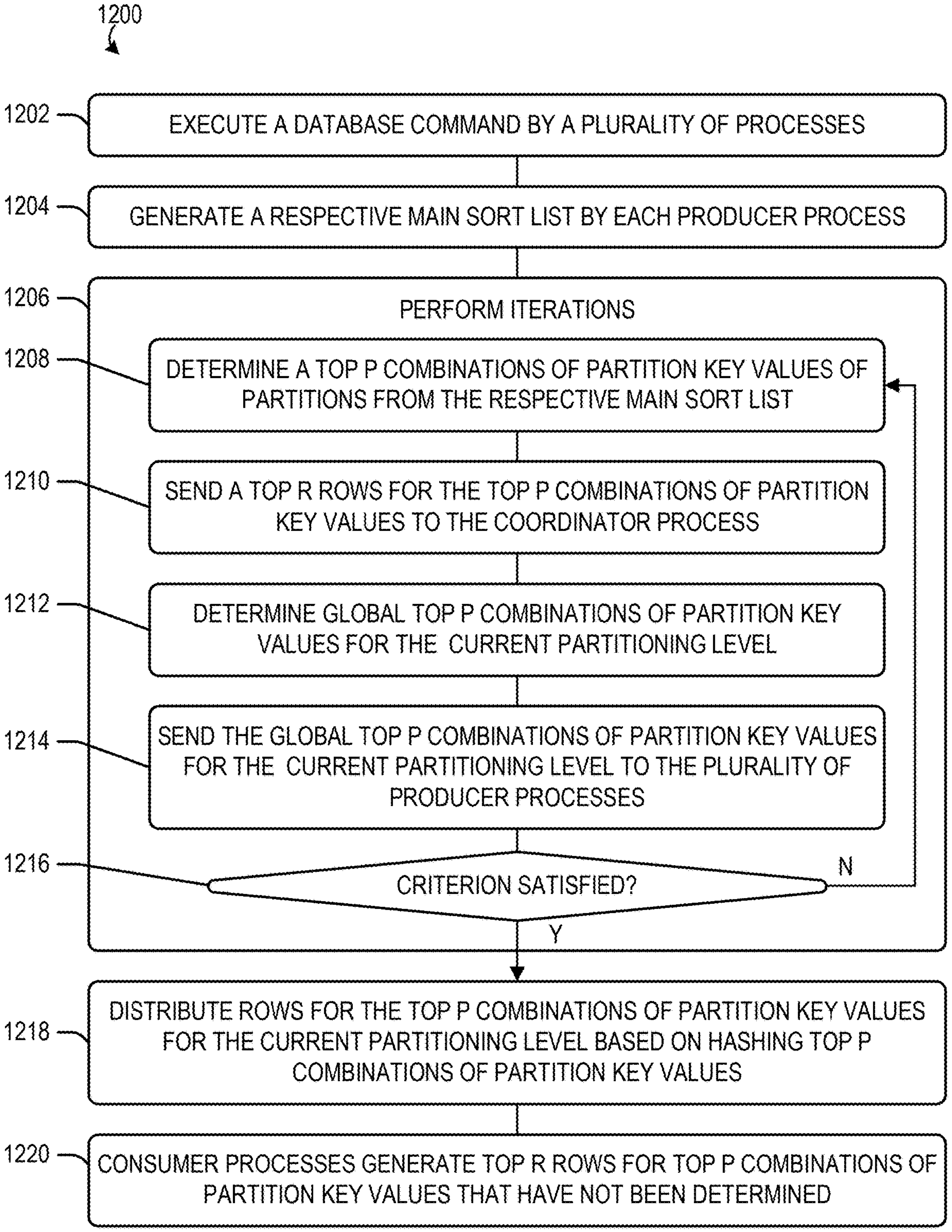
FIG. 12 is a flowchart of a method for multi-stage parallelization for scalable execution of partitioned row limiting according to an example embodiment.
Figure 13A:
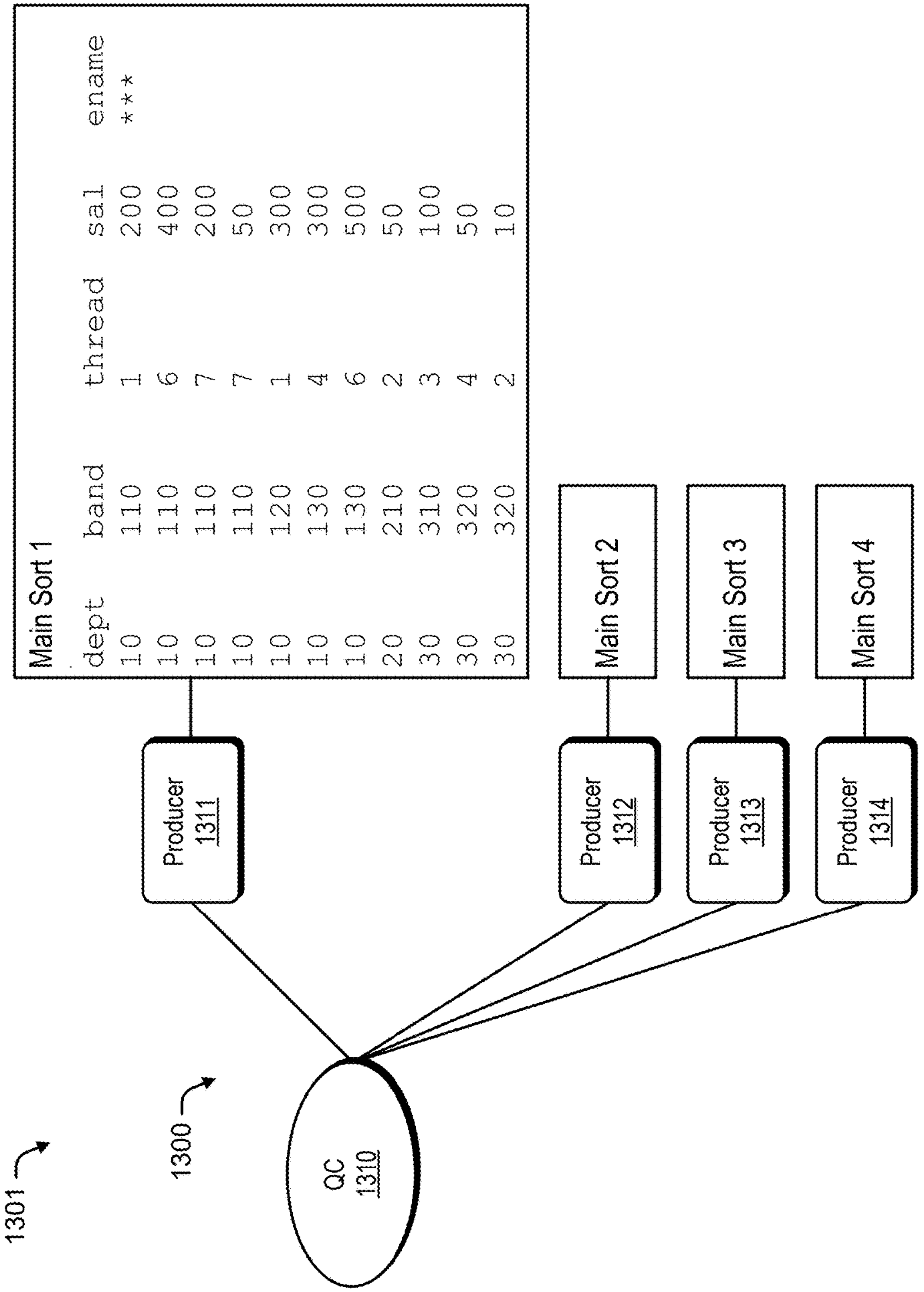
FIGS. 13A-13D are example illustrations of operations performed by a system according to an example embodiment.
Figure 13B:
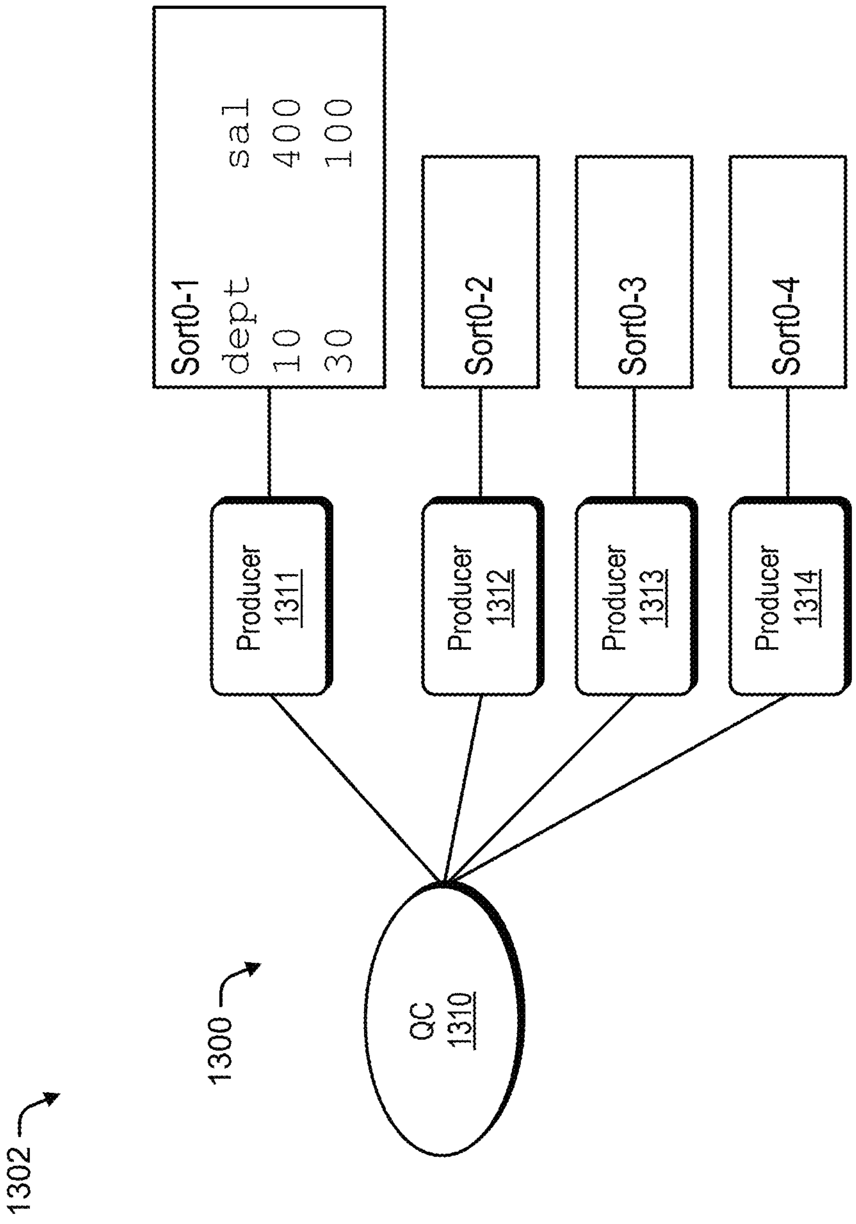
Figure 13C:
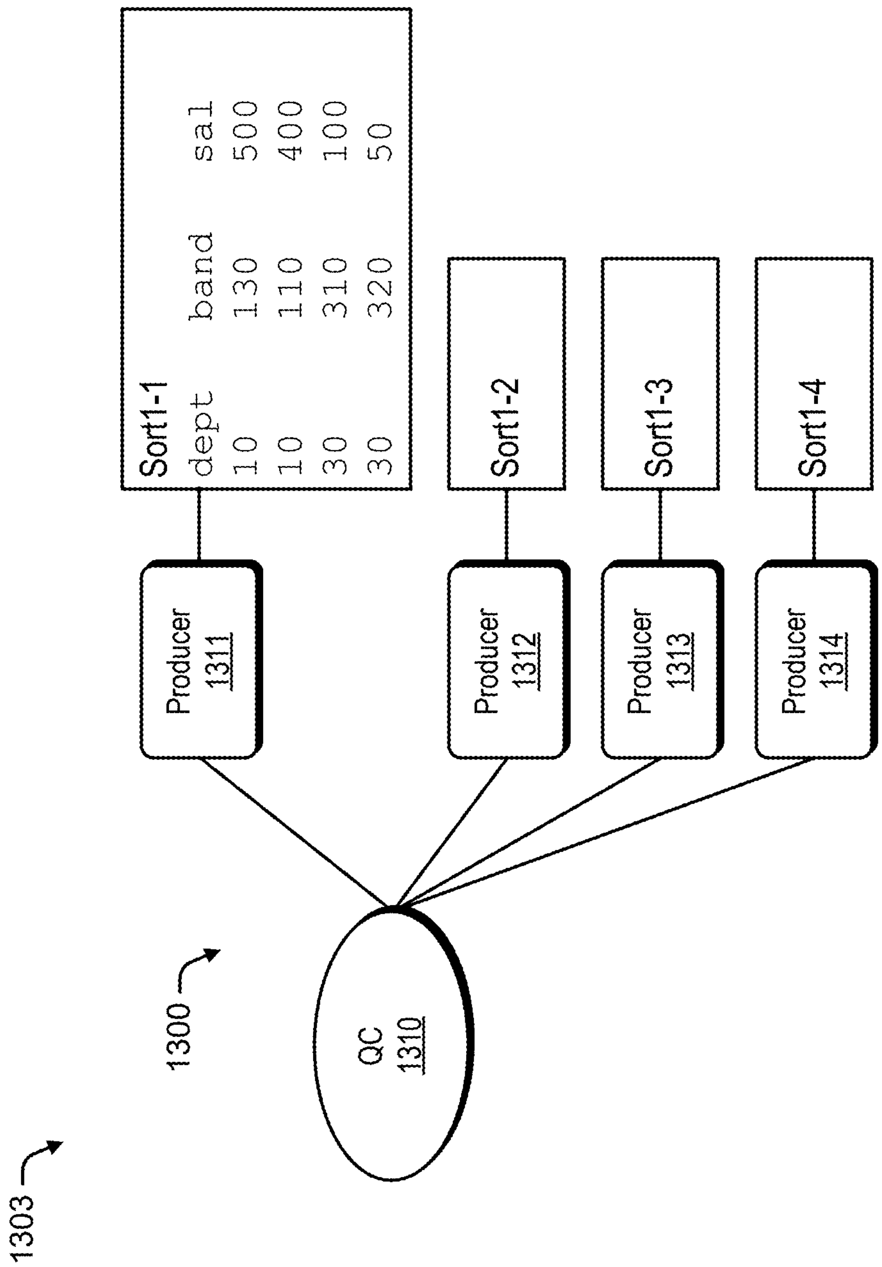
Figure 13D:
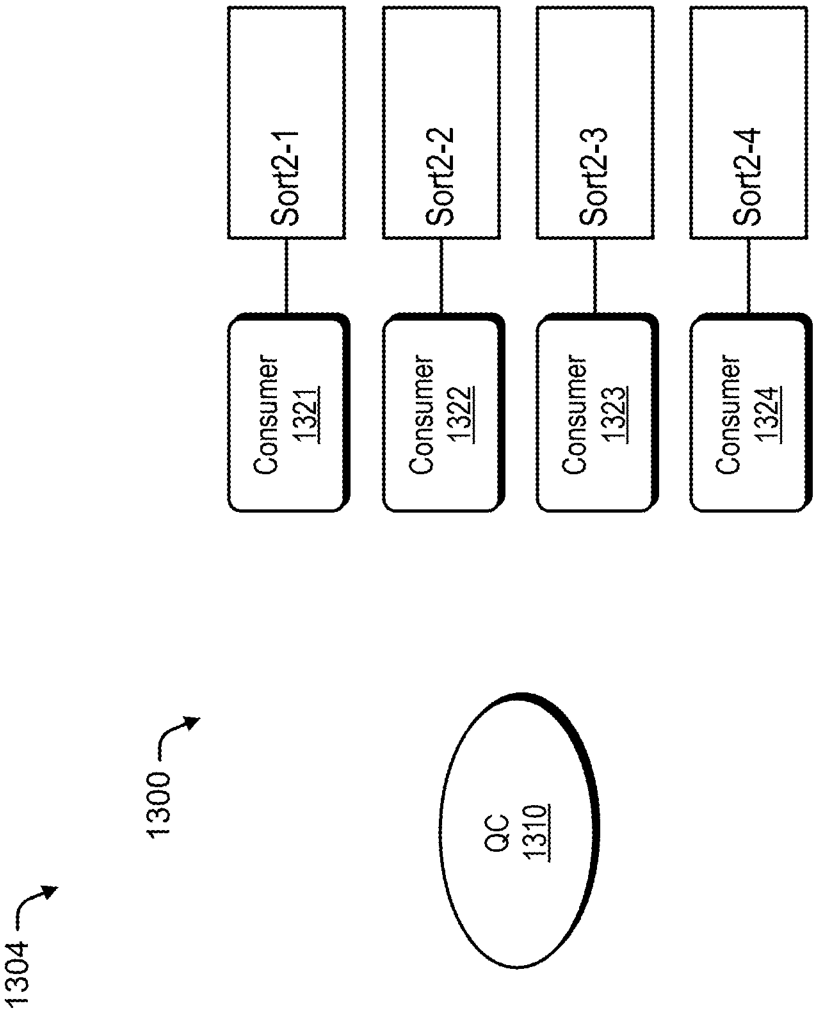

FIG. 12 is a flowchart 1200 of a method for multi-stage parallelization for scalable execution of partitioned row limiting according to an example embodiment. FIGS. 13A-13D are example illustrations of respective operations 1301-1304 performed by a system 1300 according to an example embodiment. The system 1300 includes a plurality of processes including a coordinator process 1310 and worker processes. The coordinator process 1310 can be a QC. The worker processes can be producer processes 1311-1314 and consumer processes 1321-1324. The worker processes can be parallel execution servers, parallel workers, or other types of processes. Available worker processes can operate as both producer processes and consumer processes. For example, available worker processes can operate as producer processes for a plurality of iterations and can operate as consumer processes for generating top P combinations of partition key values that have not been determined in the plurality of iterations.

At 1202, the method includes executing a database command by the plurality of processes. The database command specifies an order-by key specifying an order to sort a plurality of rows. The database command also specifies a hierarchy of partition keys by which to partition the plurality of rows. The hierarchy of partition keys includes L partitioning key levels, with each partitioning key level having a respective partition key. For example, the partition key is an expression <pbyexpr>. The database command further specifies a respective top P number for respective key level partitions to return for each L partitioning key level. For example, the top P number is <pbycount>, which is the number of partitions to return for each partition key. The database command additionally specifies an R number of rows to return for each partition key value combination identified for the database command. For example, the R number is <rowcount>.

To illustrate, in the example system 1300, there are four worker processes, and the database command is the following query:

```
SELECT deptno, ename, sal
FROM emp
ORDER BY sal DESC
FETCH FIRST        2 PARTITIONS BY dept,
                   2 PARTITIONS BY band,
                   2 PARTITIONS BY thread,
                   2 ROWS ONLY
```

In this example query, the expressions <pbyexpr> are dept, band, and thread. The hierarchy includes a first level L1 for dept, a second level L2 for band, and a third level L3 for thread. The top P number <pbycount> is 2 partitions for dept, 2 partitions for band, and 2 partitions for thread. The R number <rowcount> is 2 rows.

At 1204, the method includes each producer process of the plurality of producer processes generating a respective main sort list, such as a respective local main sort, ordered by the order-by key. In an implementation, each producer process of the plurality of producer processes generates a respective local main sort list based on the rows it has received of the plurality of rows. Each respective main sort list can include no more than R number of rows for each partition key value combination, where each partition key value combination can be based on the hierarchy of partition keys.

For example, in the operation 1301, each producer process 1311-1314 receives data from the coordinator process 1310 and produces respective main sorts 1-4 ordered by the order-by key, which is sal in descending order, DESC, grouped by the expression combinations. In the illustrated operation 1301, only main sort 1 is shown, and the ename values are not included for simplicity.

At 1206, a plurality of iterations are performed by each producer process of the plurality of producer processes and the coordinator process. The plurality of iterations is performed beginning with the highest partitioning key level, such as the first level L1, and is performed until a criterion is satisfied. For example, the hierarchy of partition keys comprises an initial key and at least one subsequent key, and the highest partitioning key level corresponds to the initial key. In the example query, the plurality of iterations is performed beginning with a sort for the dept partitions, as shown in the sort operation 1302. Each iteration is performed for the current partitioning key level of the hierarchy of partitioning key levels. For example, a sort is performed for dept as the current key level in an initial iteration, shown in the sort operation 1302, and then performed for band as a current key level in the next iteration, shown in the sort operation 1303.

At 1208, while performing the plurality of iterations, each producer process determines a top P combinations of partition key values of partitions from its respective main sort list as further partitioned by a combination of partition key values of the current partitioning key level and global top P combinations of partition key values previously determined for a most previously performed iteration, if any. At 1210, each producer process sends the top R rows for the top P combinations of partition key values to the coordinator process. At 1212, the coordinator process determines global top P combinations of partition key values for the current partitioning key level based on a consolidation of top R rows sent by the plurality of producer processes for the current partitioning key level. At 1214, the coordinator process sends the global top P combinations of partition key values for the current partitioning key level to the plurality of producer processes.

For the example query, in a first iteration sorting operation 1302, the producer process 1311 determines the top <pbycount>, 2, combinations of partitions from its main sort list, Main Sort 1 from operation 1301, as further partitioned by the partition key values for dept, which is the current partitioning key level. The producer process 1311 sends the top 2 rows for the top 2 combinations of the dept values in Sort0-1 to the QC 1310, which determines and sends the global top P combinations to the producer processes 1311-1314. In a second iteration sorting operation 1303, the producer process 1311, determines the top <pbycount>, 2, combinations of partition key values of partitions from its main sort list, Main Sort 1, as further partitioned by a combination of partition key values of the current partitioning key level for band and global top <pbycount>, 2, combinations of partition key values previously performed for dept. The producer process 1311, sends the top 2 rows for the top 2 combinations of the dept and band values in Sort1-1 to the QC 1310, which determines and sends the resulting new global top P combinations to the producer processes 1311-1314.

At 1216, a determination is made as to whether the criterion is satisfied. The criterion is based on a cardinality of the top R rows for the top P combinations of partition key values for the current partitioning key level. Cardinality is defined as the number of items in a set. In the present case, the cardinality is the number of unique combinations, which is the number of rows in a current sort operation. In an embodiment, the criterion is based on the cardinality of the top R rows for the top P combinations of partition key values being greater than or equal to a number of available processes that can be executed concurrently, such as greater than or equal to a DOP. Thus, the plurality of iterations can be performed until the cardinality of the top R rows for the top P combinations of partition key values is greater than or equal to the number of available processes that can be executed concurrently. For the example query, there are four worker processes, which results in a DOP of four. Two sort operations are performed between the producer processes 1311-1314 and the QC 1310, which results in four dept/band combinations, which is greater than or equal to the DOP of four, the number of available worker processes.

At 1218, in response to determining that the criterion is satisfied, each producer process of the plurality of producer processes distributes rows for the top P combinations of partition key values for the current partitioning key level based on hashing top P combinations of partition key values that have been determined in the plurality of iterations for the database command. For example, the producer processes distribute all rows belonging to the top P combinations of the partition key values for the current partitioning key level to a plurality of consumer processes based on hashing top P combinations of partition key values that have been determined in the plurality of iterations for the database command. As a further example, if there are two dept partitions, two band partitions, two thread partitions, two rows only, and DOP=4, then all the rows belonging to the dept/band combinations are produced from the main sort for the four dept/band pairs and distributed to the plurality of consumer processes.

At 1220, the plurality of consumer processes generate top R rows for the top P combinations of partition key values for any partitioning key level for which top P combinations of partition key values have not been determined in the plurality of iterations for the database command. For example, the plurality of consumer processes locally generate top R rows for the top P combinations of partition key values for any partitioning key level for which top P combinations of partition key values have not been determined for the database command. The plurality of consumer processes locally generate the top R rows for the top P combinations of partition key values without sending the top R rows for said top P combinations of partition key values to the coordinator process. For the example query, in the operation 1304, the consumer processes 1321-1324 perform respective local sorts Sort2-1-Sort2-4 for the dept/band/thread key combinations in a local phase without requiring communication and/or coordination with the QC 1310.

As discussed above, for the example query, there are four worker processes, which results in the DOP being four. Two sort operations are first performed between the producer processes 1311-1314 and the QC 1310, which results in four dept/band combinations. The results are distributed by HASH to the four consumer processes 1321-1324, which then perform the remaining thread partition sort operations locally. Thus, two rounds of communication are performed for the first two sorts instead of three rounds of communication for all three sorts. All four consumer processes 1321-1324 are utilized for the HASH by dept/band combinations instead of only three for HASH by dept. The local sorting of rows by each consumer processes 1321-1324 for a unique combination of partition expressions also avoids duplicate rows in the results.

In an implementation, each consumer process of the plurality of consumer processes generates a respective second main sort list, such as a second local main sort list, based on receiving top R rows for the top P combinations of the partition key values for the current partitioning key level, where each respective second main sort list is ordered by the order-by key. Each respective second main sort list can include no more than R number of rows for each partition key value combination, and each partition key value combination can be based on the hierarchy of partition keys. Each consumer process can then eliminate, based on the second main sort list, duplicate rows from the received top R rows for the top P combinations of the partition key values for the current partitioning level.

In a variation of the above example, there are again four worker processes, and the database command is the following query:

```
SELECT deptno, ename, sal
FROM emp
ORDER BY sal DESC
```

-continued

| | |
|---|---|
| FETCH FIRST | 3 PARTITIONS BY dept,<br>2 PARTITIONS BY band,<br>2 PARTITIONS BY thread,<br>3 ROWS ONLY |

Compared to the example query above, this query includes 3 department partitions instead of 2. Two sort operations are first performed with the QC, which results in six dept/band combinations. Again, the results are distributed by HASH to the four consumer processes 1321-1324, which then perform the remaining thread partition sort locally. As above, two rounds of communication are performed for the first two sorts instead of three rounds of communication for all three sorts. All four consumer processes 1321-1324 are utilized for the HASH by dept/band combinations instead of only three for HASH by dept.

DBMS Overview

A database management system (DBMS) manages a database. A DBMS may comprise one or more database servers. A database comprises database data and a database dictionary that are stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically-marked data objects; however, the hierarchically-marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL; some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

In a DOCS, a database command may be in the form of functions or object method calls that invoke CRUD (Create Read Update Delete) operations. An example of an API for such functions and method calls is MQL (MondoDB™ Query Language). In a DOCS, database objects include a collection of documents, a document, a view, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed, or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snapshot time of the query. The DBMS determines which undo records to apply to a data block based on the respective logical times associated with the undo records.

When operations are referred to herein as being performed at commit time or as being commit time operations, the operations are performed in response to a request to commit a database transaction. DML commands may be auto-committed, that is, are committed in a database session without receiving another command that explicitly requests to begin and/or commit a database transaction. For DML commands that are auto-committed, the request to execute the DML command is also a request to commit the changes made for the DML command.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase, and the commit phase. In the prepare-to-commit phase, branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e. can be created or terminated by the database server) and perform various database server functions. Database processes include processes running within a database session established for a client.

A database process is a unit of execution. A database process can be a computer system process or thread or a user-defined execution context such as a user thread or fiber. Database processes may also include "database server system" processes that provide services and/or perform functions on behalf of the entire database server. Such database server system processes include listeners, garbage collectors, log writers, and recovery processes.

A multi-node database management system is made up of interconnected computing nodes ("nodes"), each running a database server that shares access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A database dictionary may comprise multiple data structures that store database metadata. A database dictionary may, for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the procedure's arguments and the return data type, and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user-defined function implemented in a JAVA class may be defined in part by the database dictionary by specifying the name of the user-defined function and by specifying a reference to a file containing the source code of the Java class (i.e., java file) and the compiled version of the class (i.e., class file).

Native data types are data types supported by a DBMS "out-of-the-box". Non-native data types, on the other hand, may not be supported by a DBMS out-of-the-box. Non-native data types include user-defined abstract types or object classes. Non-native data types are only recognized and processed in database commands by a DBMS once the non-native data types are defined in the database dictionary of the DBMS, by, for example, issuing DDL statements to the DBMS that define the non-native data types. Native data types do not have to be defined by a database dictionary to be recognized as a valid data types and to be processed by a DBMS in database statements. In general, database software of a DBMS is programmed to recognize and process native data types without configuring the DBMS to do so by, for example, defining a data type by issuing DDL statements to the DBMS.

Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 14:
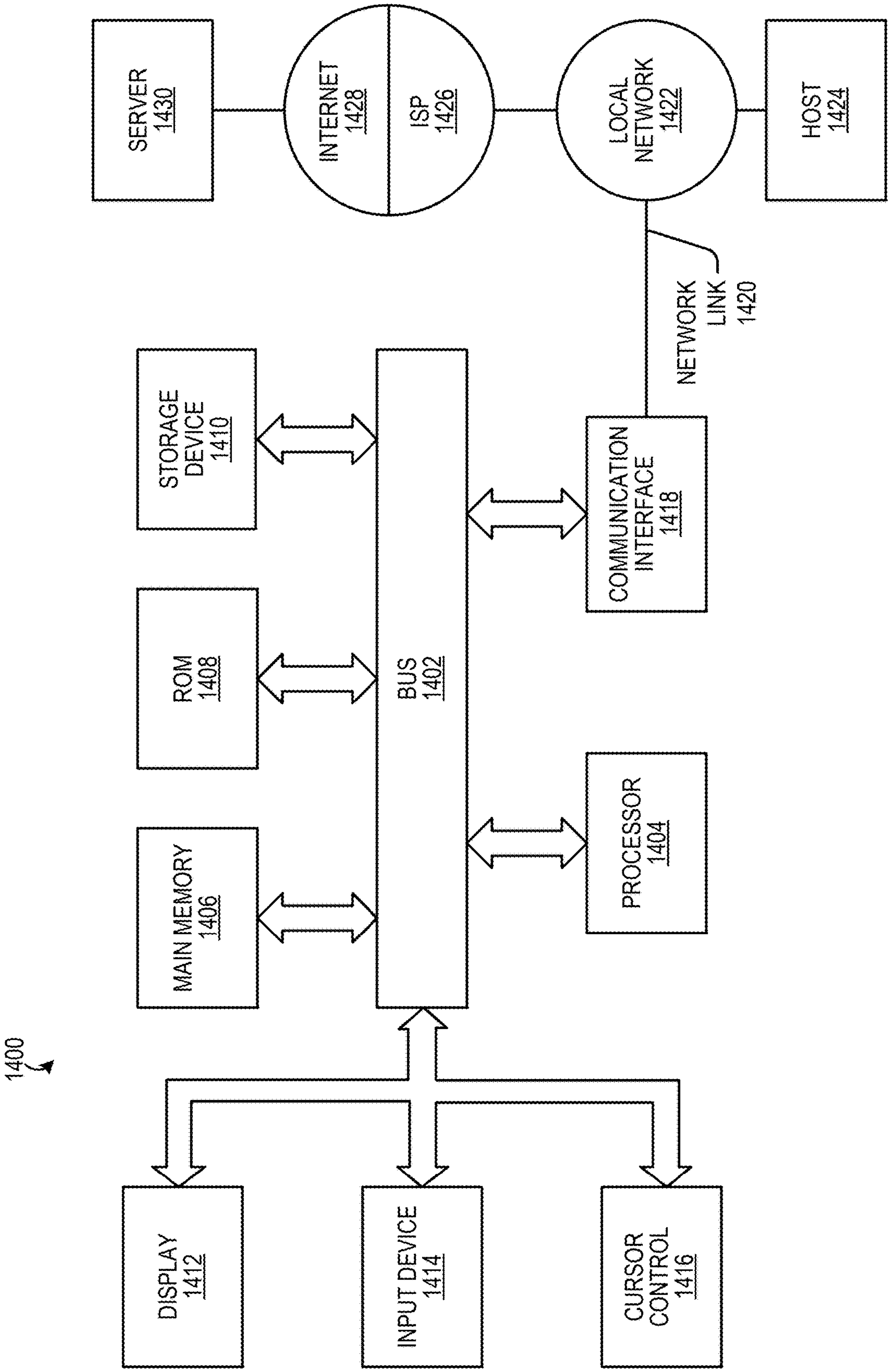
FIG. 14 is a block diagram that illustrates a computer system upon which aspects of the illustrative embodiments may be implemented.

For example, FIG. 14 is a block diagram that illustrates a computer system 1400 upon which aspects of the illustrative embodiments may be implemented. Computer system 1400 includes a bus 1402 or other communication mechanism for communicating information, and a hardware processor 1404 coupled with bus 1402 for processing information. Hardware processor 1404 may be, for example, a general-purpose microprocessor.

Computer system 1400 also includes a main memory 1406, such as a random-access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Such instructions, when stored in non-transitory storage media accessible to processor 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processor 1404. A storage device 1410, such as a magnetic disk, optical disk, or solid-state drive is provided and coupled to bus 1402 for storing information and instructions.

Computer system 1400 may be coupled via bus 1402 to a display 1412 for displaying information to a computer user. An input device 1414, including alphanumeric and other keys, is coupled to bus 1402 for communicating information and command selections to processor 1404. Another type of user input device is cursor control 1416, such as a mouse, a trackball, a touch screen, a track pad, and/or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

Computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1410. Volatile media includes dynamic memory, such as main memory 1406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and/or any other storage media.

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid-state drive of a remote computer. The remote computer can load the instructions into its dynamic memory and send the instructions over a telephone line using a modem or send the instructions using a network. A receiver, such as a modem, local to computer system 1400 can receive the data and use, for an example, an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN. Wireless links may also be implemented, such as to a wireless local area network (WLAN) or to a cellular network. In any such implementation, communication interface 1418 sends and receives electrical, electromagnetic, radio, optical, and/or other signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world-wide packet data communication network now commonly referred to as the "Internet" 1428. Local network 1422 and Internet 1428 both use electrical, electromagnetic, or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution.

Software Overview

Figure 15:
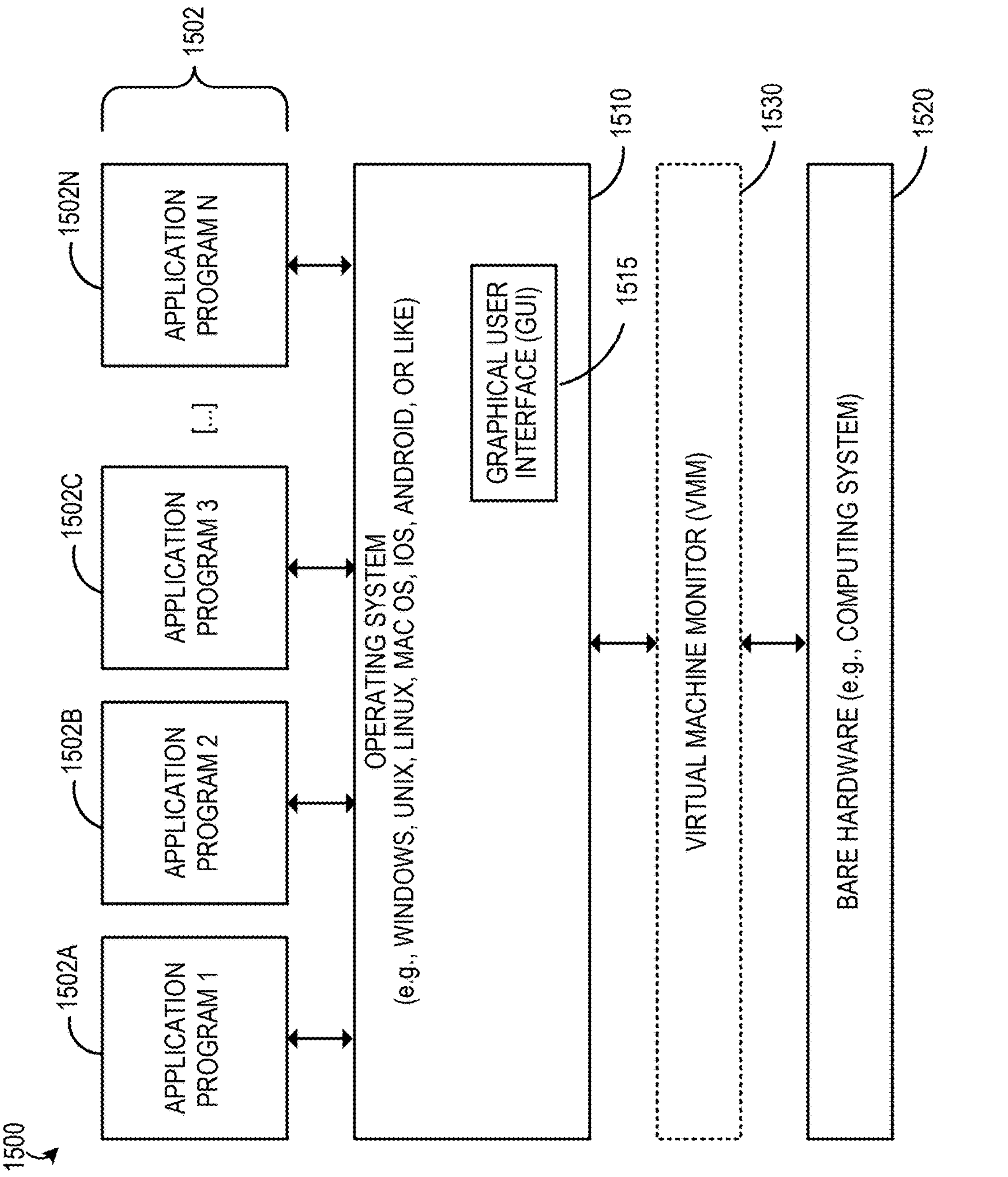
FIG. 15 is a block diagram of a basic software system that may be employed for controlling the operation of a computer system to implement aspects of the illustrative embodiments.

FIG. 15 is a block diagram of a basic software system 1500 that may be employed for controlling the operation of computer system 1400. Software system 1500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1500 is provided for directing the operation of computer system 1400. Software system 1500, which may be stored in system memory (RAM) 1406 and on fixed storage (e.g., hard disk or flash memory) 1410, includes a kernel or operating system (OS) 1510.

The OS 1510 manages low-level aspects of computer operation, including managing execution of processes, memory allocation, file input and output (I/O), and device I/O. One or more application programs, represented as 1502A, 1502B, 1502C . . . 1502N, may be "loaded" (e.g., transferred from fixed storage 1410 into memory 1406) for execution by the system 1500. The applications or other software intended for use on computer system 1400 may also be stored as a set of downloadable computer-executable instructions, for example, for downloading and installation from an Internet location (e.g., a Web server, an app store, or other online service).

Software system 1500 includes a graphical user interface (GUI) 1515, for receiving user commands and data in a graphical (e.g., "point-and-click" or "touch gesture") fashion. These inputs, in turn, may be acted upon by the system 1500 in accordance with instructions from operating system 1510 and/or application(s) 1502. The GUI 1515 also serves to display the results of operation from the OS 1510 and application(s) 1502, whereupon the user may supply additional inputs or terminate the session (e.g., log off).

OS 1510 can execute directly on the bare hardware 1520 (e.g., processor(s) 1404) of computer system 1400. Alternatively, a hypervisor or virtual machine monitor (VMM) 1530 may be interposed between the bare hardware 1520 and the OS 1510. In this configuration, VMM 1530 acts as a software "cushion" or virtualization layer between the OS 1510 and the bare hardware 1520 of the computer system 1400.

VMM 1530 instantiates and runs one or more virtual machine instances ("guest machines"). Each guest machine comprises a "guest" operating system, such as OS 1510, and one or more applications, such as application(s) 1502, designed to execute on the guest operating system. The VMM 1530 presents the guest operating systems with a virtual operating platform and manages the execution of the guest operating systems.

In some instances, the VMM 1530 may allow a guest operating system to run as if it is running on the bare hardware 1520 of computer system 1400 directly. In these instances, the same version of the guest operating system configured to execute on the bare hardware 1520 directly may also execute on VMM 1530 without modification or reconfiguration. In other words, VMM 1530 may provide full hardware and CPU virtualization to a guest operating system in some instances.

In other instances, a guest operating system may be specially designed or configured to execute on VMM 1530 for efficiency. In these instances, the guest operating system is "aware" that it executes on a virtual machine monitor. In other words, VMM 1530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

a plurality of processes executing a database command, wherein said plurality of processes includes a coordinator process, a plurality of producer processes, and a plurality of consumer processes, wherein said database command specifies:

an order-by key specifying an order to sort a plurality of rows;

a hierarchy of partition keys by which to partition said plurality of rows, said hierarchy of partition keys comprising L partitioning key levels, each partitioning key level having a respective partition key;

a respective top P number for respective key level partitions to return for each L partitioning key level;

an R number of rows to return for each partition key value combination identified for said database command;

each producer process of said plurality of producer processes generating a respective main sort list ordered by said order-by key;

in an iteration, of a plurality of iterations, the iteration performed for a current partitioning key level of said hierarchy of partitioning key levels, said plurality of iterations performed beginning with a highest partitioning key level and performed until a criterion is satisfied, each producer process of said plurality of producer processes:

determining a top P combinations of partition key values of partitions from said respective main sort list as further partitioned by a combination of partition key values of said current partitioning key level and global top P combinations of partition key values previously determined for a most previously performed iteration, if any;

sending a top R rows for said top P combinations of partition key values to said coordinator process;

said coordinator process determining global top P combinations of partition key values for said current partitioning key level based on a consolidation of top R rows sent by said plurality of producer processes for said current partitioning key level;

said coordinator process sending said global top P combinations of partition key values for said current partitioning key level to said plurality of producer processes;

in response to determining that said criterion is satisfied, each producer process of said plurality of producer processes distributing rows for said top P combinations of partition key values for said current partitioning key level based on hashing top P combinations of partition key values that have been determined in said plurality of iterations for said database command;

wherein said criterion is based on a cardinality of said top R rows for said top P combinations of partition key values for said current partitioning key level; and said plurality of consumer processes generating top R rows for said top P combinations of partition key values for any partitioning key level for which top P combinations of partition key values have not been determined in said plurality of iterations for said database command.

2. The method of claim 1, further comprising determining that the said criterion is satisfied, wherein said criterion is based on said cardinality of said top R rows for said top P combinations of partition key values being greater than or equal to a number of available processes that can be executed concurrently.

3. The method of claim 2, wherein said plurality of processes includes a plurality of available worker processes, wherein the available worker processes operate as both the producer processes and the consumer processes, wherein a number of available worker processes comprise the number of available processes.

4. The method of claim 2, wherein the hierarchy of partition keys comprises an initial key and at least one subsequent key, wherein the highest partitioning key level corresponds to the initial key, and wherein the plurality of iterations are performed until said cardinality of said top R rows for said top P combinations of partition key values is greater than or equal to a number of available processes that can be executed concurrently.

5. The method of claim 1, wherein distributing said rows comprises distributing said rows for said top P combinations of said partition key values for said current partitioning key level to said plurality of consumer processes based on hashing top P combinations of partition key values that have been determined in said plurality of iterations for said database command.

6. The method of claim 1, wherein said plurality of consumer processes locally generate top R rows for said top P combinations of partition key values for any partitioning key level for which top P combinations of partition key values have not been determined for said database command.

7. The method of claim 1, wherein each producer process of said plurality of producer processes generates said respective main sort list based on rows it has received of the plurality of rows.

8. The method of claim 1, wherein each respective main sort list includes no more than R number rows for each partition key value combination, wherein said each partition key value combination is based on said hierarchy of partition keys.

9. The method of claim 1, further comprising each consumer process of said plurality of consumer processes:

generating a respective second main sort list based on receiving top R rows for said top P combinations of said partition key values for said current partitioning key level, each respective second main sort list ordered by said order-by key; and eliminating, based on said second main sort list, duplicate rows from said received top R rows for said top P combinations of said partition key values for said current partitioning key level.

10. The method of claim 9, wherein each respective second main sort list includes no more than R number rows for each partition key value combination, wherein said each partition key value combination is based on said hierarchy of partition keys.

11. One or more non-transitory storage media storing one or more sequences of instructions which, when executed by one or more computing devices, cause:

a plurality of processes executing a database command, wherein said plurality of processes includes a coordinator process, a plurality of producer processes, and a plurality of consumer processes, wherein said database command specifies:

an order-by key specifying an order to sort a plurality of rows;

a hierarchy of partition keys by which to partition said plurality of rows, said hierarchy of partition keys comprising L partitioning key levels, each partitioning key level having a respective partition key;

a respective top P number for respective key level partitions to return for each L partitioning key level;

an R number of rows to return for each partition key value combination identified for said database command;

each producer process of said plurality of producer processes generating a respective main sort list ordered by said order-by key;

in an iteration, of a plurality of iterations, the iteration performed for a current partitioning key level of said hierarchy of partitioning key levels, said plurality of iterations performed beginning with a highest partitioning key level and performed until a criterion is satisfied, each producer process of said plurality of producer processes:

determining a top P combinations of partition key values of partitions from said respective main sort list as further partitioned by a combination of partition key values of said current partitioning key level and global top P combinations of partition key values previously determined for a most previously performed iteration, if any;

sending a top R rows for said top P combinations of partition key values to said coordinator process;

said coordinator process determining global top P combinations of partition key values for said current partitioning key level based on a consolidation of top R rows sent by said plurality of producer processes for said current partitioning key level;

said coordinator process sending said global top P combinations of partition key values for said current partitioning key level to said plurality of producer processes;

in response to determining that said criterion is satisfied, each producer process of said plurality of producer processes distributing rows for said top P combinations of partition key values for said current partitioning key level based on hashing top P combinations of partition key values that have been determined in said plurality of iterations for said database command;

wherein said criterion is based on a cardinality of said top R rows for said top P combinations of partition key values for said current partitioning key level; and said plurality of consumer processes generating top R rows for said top P combinations of partition key values for any partitioning key level for which top P combinations of partition key values have not been determined in said plurality of iterations for said database command.

12. The one or more non-transitory storage media of claim 11, wherein the instructions, when executed by the one or more computing devices, further cause determining that the said criterion is satisfied, wherein said criterion is based on said cardinality of said top R rows for said top P combinations of partition key values being greater than or equal to a number of available processes that can be executed concurrently.

13. The one or more non-transitory storage media of claim 12, wherein said plurality of processes includes a plurality of available worker processes, wherein the available worker processes operate as both the producer processes and the consumer processes, wherein a number of available worker processes comprise the number of available processes.

14. The one or more non-transitory storage media of claim 12, wherein the hierarchy of partition keys comprises an initial key and at least one subsequent key, wherein the highest partitioning key level corresponds to the initial key, and wherein the plurality of iterations are performed until said cardinality of said top R rows for said top P combinations of partition key values is greater than or equal to a number of available processes that can be executed concurrently.

15. The one or more non-transitory storage media of claim 11, wherein distributing said rows comprises distributing said rows for said top P combinations of said partition key values for said current partitioning key level to said plurality of consumer processes based on hashing top P combinations of partition key values that have been determined in said plurality of iterations for said database command.

16. The one or more non-transitory storage media of claim 11, wherein said plurality of consumer processes locally generate top R rows for said top P combinations of partition key values for any partitioning key level for which top P combinations of partition key values have not been determined for said database command.

17. The one or more non-transitory storage media of claim 11, wherein each producer process of said plurality of producer processes generates said respective main sort list based on rows it has received of the plurality of rows.

18. The one or more non-transitory storage media of claim 11, wherein each respective main sort list includes no more than R number rows for each partition key value combination, wherein said each partition key value combination is based on said hierarchy of partition keys.

19. The one or more non-transitory storage media of claim 11, wherein the instructions, when executed by the one or more computing devices, further cause each consumer process of said plurality of consumer processes:

generating a respective second main sort list based on receiving top R rows for said top P combinations of said partition key values for said current partitioning key level, each respective second main sort list ordered by said order-by key; and eliminating, based on said second main sort list, duplicate rows from said received top R rows for said top P combinations of said partition key values for said current partitioning key level.

20. The one or more non-transitory storage media of claim 19, wherein each respective second main sort list includes no more than R number rows for each partition key value combination, wherein said each partition key value combination is based on said hierarchy of partition keys.

* * * * *